US012785079B2

(12) United States Patent
Jeong et al.

(10) Patent No.: US 12,785,079 B2
(45) Date of Patent: Nov. 3, 2026

(54) CARBON COMPOSITE FOR ELECTRODE, BATTERY COMPRISING SAME, AND METHOD FOR MANUFACTURING SAME

(71) Applicants: LG Energy Solution, Ltd., Seoul (KR); KOREA ADVANCED INSTITUTE OF SCIENCE AND TECHNOLOGY, Daejeon (KR)

(72) Inventors: Yo-Chan Jeong, Daejeon (KR); Jinwoo Lee, Daejeon (KR); Cheol-Young Park, Daejeon (KR); Kwon-Nam Sohn, Daejeon (KR); Seung-Bo Yang, Daejeon (KR); Won-Gwang Lim, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 824 days.

(21) Appl. No.: 18/083,226

(22) Filed: Dec. 16, 2022

(65) Prior Publication Data

US 2023/0327084 A1 Oct. 12, 2023

(30) Foreign Application Priority Data

Apr. 8, 2022 (KR) ........................ 10-2022-0044174
Oct. 27, 2022 (KR) ........................ 10-2022-0140744

(51) Int. Cl.
*H01M 4/583* (2010.01)
*H01M 4/36* (2006.01)
*H01M 4/02* (2006.01)

(52) U.S. Cl.
CPC ........... *H01M 4/366* (2013.01); *H01M 4/583* (2013.01); *H01M 2004/021* (2013.01)

(58) Field of Classification Search
CPC . H01M 4/366; H01M 4/583; H01M 2004/021
See application file for complete search history.

(56) References Cited

U.S. PATENT DOCUMENTS

2013/0337347 A1* 12/2013 Pol ........................ H01M 4/583 568/18
2014/0255786 A1 9/2014 Oh et al.
(Continued)

FOREIGN PATENT DOCUMENTS

CN 108615896 A 10/2018
KR 10-2014-0111516 A 9/2014
(Continued)

OTHER PUBLICATIONS

Wu, Yi, et al. "Ligand regulation to prepare an Fe, N, S tri-codoped hollow carbon electrocatalyst for enhanced ORR performance and Zn-Air Batteries." Sustainable Energy & Fuels, vol. 4, No. 8, May 27, 2020, pp. 4117-4125. (Year: 2020).*
(Continued)

*Primary Examiner* — Allison Bourke
*Assistant Examiner* — Verita E Grannum
(74) *Attorney, Agent, or Firm* — Bryan Cave Leighton Paisner LLP

(57) ABSTRACT

A carbon composite for an electrode of a battery, method for manufacturing the same, an electrode including the same, and a battery including the same are provided. The carbon composite comprises a porous carbon material including an outer surface and pores comprising an inner surface, the porous carbon material being doped with a heteroelement, and a catalyst comprising a transition metal formed on the outer surface or the inner surface of at least a plurality of the pores, and provides improved kinetic activity in electrochemical reaction during charge and discharge of the battery and cost efficiency for commercialization of the battery.

29 Claims, 15 Drawing Sheets

(56) References Cited

U.S. PATENT DOCUMENTS

| | | | | |
|---|---|---|---|---|
| 2016/0190547 | A1* | 6/2016 | Schweiss | H01M 4/80 429/405 |
| 2018/0019465 | A1 | 1/2018 | Kim et al. | |
| 2018/0297850 | A1* | 10/2018 | Tour | H01M 4/139 |
| 2021/0050587 | A1 | 2/2021 | Lee et al. | |
| 2021/0242463 | A1 | 8/2021 | Kim et al. | |
| 2021/0384508 | A1 | 12/2021 | Kim et al. | |

FOREIGN PATENT DOCUMENTS

| | | | |
|---|---|---|---|
| KR | 10-2017-0035817 | A | 3/2017 |
| KR | 10-2018-0074902 | A | 7/2018 |
| KR | 10-2018-0133063 | A | 12/2018 |
| KR | 10-2020-0003575 | A | 1/2020 |
| KR | 10-2020-0022975 | A | 3/2020 |
| KR | 10-2020-0052525 | A | 5/2020 |
| KR | 10-2020-0052840 | A | 5/2020 |
| KR | 10-2020-0072893 | A | 6/2020 |
| KR | 10-2021-0037849 | A | 4/2021 |
| KR | 10-2021-0139359 | A | 11/2021 |
| WO | 2020198095 | A1 | 10/2020 |

OTHER PUBLICATIONS

Martin et al. "Dynamic Adsorption on Activated Carbons of SO2 Traces in Air: I. Adsorption Capacities". Carbon. vol. 40, Issue 12. 2002. (Year: 2002).*

W. G. Lim et al., "Manipulating local environment of atomically dispersed Fe electrocatalyst for high energy and long cycle Li—S pouch cell", Research Square, 2021, pp. 1-23.

Won-Gwang Lim et al., "Manipulating Local Environment of Atomically Dispersed Fe Electrocatalyst for High Energy and Long Cycle Li—S Pouch Cell", Research Square (Dec. 16, 2021) pp. 1-23.

Ying-Ying Dai et al., "Manipulating metal-sulfur interactions for achieving high-performance S cathodes for room temperature Li/Na-sulfur batteries", Carbon Energy, vol. 3, Iss. 2, (Feb. 19, 2021), pp. 253-270.

* cited by examiner

CARBON COMPOSITE FOR ELECTRODE, BATTERY COMPRISING SAME, AND METHOD FOR MANUFACTURING SAME

CROSS-REFERENCE TO RELATED APPLICATIONS

This application claims priority to Korean Patent Application No. 10-2022-0044174 filed on Apr. 8, 2022 and Korean Patent Application No. 10-2022-0140744 filed on Oct. 27, 2022, the disclosures of which are incorporated herein by reference in their entirety.

TECHNICAL FIELD

The present disclosure generally relates to the field of batteries, and more particularly, to a carbon composite for an electrode of a battery, an electrode comprising an electrode active material including the same, a battery including the electrode, and a method of manufacturing the same.

BACKGROUND ART

A lithium-sulfur battery is an energy storage device including a sulfur containing material having a sulfur-sulfur (S—S) bond for a positive electrode active material and a lithium metal for a negative electrode active material. Sulfur, a main component of the positive electrode active material, is abundant in nature and can be found around the world, is non-toxic, and has low atomic weight.

As secondary batteries are used in a wide range of applications including electric vehicles (EVs) and energy storage systems (ESSs), attention is drawn to lithium-sulfur batteries theoretically having higher energy storage density by weight (~2,600 Wh/kg) than lithium-ion secondary batteries having lower energy storage density by weight (~250 Wh/kg).

During discharging, lithium-sulfur batteries undergo oxidation at the negative electrode active material, lithium, by releasing electrons into lithium cation, and reduction at the positive electrode active material, the sulfur containing material, by accepting electrons. Through the reduction reaction, the sulfur containing material is converted to sulfur anion by the S—S bond accepting two electrons. The lithium cation produced by the oxidation reaction of lithium migrates to the positive electrode via an electrolyte, and bonds with the sulfur anion produced by the reduction reaction of the sulfur containing material to form a salt. Specifically, sulfur before the discharge has a cyclic $S_8$ structure, and it is converted to lithium polysulfide ($Li_2S_x$) through the reduction reaction and is completely reduced to lithium sulfide ($Li_2S$).

Since sulfur used in the positive electrode active material is nonconductive, the migration of electrons produced by electrochemical reaction is inhibited, and there are problems with elution of lithium polysulfide ($Li_2Sx$) during charging and discharging, shuttling of the lithium polysulfide to the negative electrode and causing loss of the positive electrode active material ("shuttle effect"), and degradation in battery life and speed characteristics caused by slow kinetic activity in the electrochemical reaction due to low electrical conductivity of sulfur and lithium sulfide.

In these circumstances, recently, many studies have been made to improve the performance of lithium-sulfur secondary batteries by improving the kinetic activity in the redox reaction of sulfur during charging and discharging by use of platinum (Pt) which has been primarily used as electrochemical catalysts. However, noble metal catalysts such as platinum are difficult to commercialize due to high costs and have poisoning risks by the redox reaction of sulfur during charging and discharging, so it is not easy to use for positive electrode materials of lithium-sulfur secondary batteries.

In addition, single-atomic catalyst materials have been studied to increase atomic utilization efficiency to a high level close to 100% and minimize the amount of the catalyst in the positive electrode for higher performance of lithium-sulfur secondary batteries. However, most of the single-atomic catalysts have inadequate performance improvement effect of lithium-sulfur secondary batteries due to low adsorption on lithium sulfide and consequential low conversion performance. In addition, using single-atomic catalysts in combination with particle-type catalysts has been studied, but in this case, low atomic utilization efficiency and inadequate effect.

Accordingly, there is a need for development of electrode materials for improving the kinetic activity in the electrochemical reaction during charge and discharge of lithium-sulfur secondary batteries and the cost efficiency for commercialization.

The present disclosure is directed to overcoming one or more of these challenges. The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, a carbon composite for an electrode of a battery, an electrode material including the same, an electrode including the same, and a battery including the same, and a method of manufacturing the same for improving the kinetic activity in the electrochemical reaction of sulfur during the charge and discharge of lithium-sulfur secondary batteries and the cost efficiency are provided in this disclosure.

In one aspect, the disclosure relates to a carbon composite for an electrode of a battery, and the carbon composite may comprise: a porous carbon material including an outer surface and pores comprising an inner surface, the porous carbon material being doped with a heteroelement; and a catalyst formed on the outer surface or the inner surface of at least a plurality of the pores. The catalyst may comprise a transition metal.

In some embodiments, the heteroelement may comprise oxygen, phosphorus, boron, or sulfur.

In some embodiments, the heteroelement may comprise sulfur.

In some embodiments, a distance between a transition metal atom of the catalyst closest to a neighboring heteroelement doped in the porous carbon material and the neighboring heteroelement may be 10 nm or less.

In some embodiments, the carbon composite may have a BET specific surface area of 200 $m^2/g$ or larger.

In some embodiments, the catalyst may further comprise a non-metal element forming a ligand with the transition metal. The non-metal element may be one or more selected from the group consisting of hydrogen, boron, nitrogen, oxygen, fluorine, neon, silicon, phosphor, chlorine, bromine, and iodine.

In some embodiments, the catalyst may comprise iron as the transition metal and nitrogen as the non-metal element.

In some embodiments, the catalyst may further comprise an organic support.

In some embodiments, the catalyst may comprise a single atom catalyst, and the transition metal may be atomically dispersed in the carbon composite.

In some embodiments, the transition metal may be one or more selected from the group consisting of zinc, vanadium, chromium, manganese, iron, cobalt, nickel, copper, zirconium, niobium, molybdenum, technetium, rubidium, rhodium, palladium, silver, cadmium, lanthanum, hafnium, tantalum, tungsten, osmium, iridium, cerium, gallium, scandium, titanium, gallium, and indium.

In some embodiments, the transition metal may include iron.

In some embodiments, a molar ratio of the heteroelement doped in the porous carbon to the transition metal of the catalyst is 0.5:1 to 8:1.

In some embodiments, the heteroelement may comprise sulfur, and the sulfur may comprise S and $SO_2$, and a molar ratio of $SO_2$ to S may be 1 or less.

In some embodiments, the sulfur may comprise S and $SO_2$, and a molar ratio of $SO_2$ to S may be in a range from 0.1 to 0.7.

In some embodiments, the pores of the porous carbon material may comprise micropores having pore diameters equal to or larger than 0.2 nm and smaller than 2 nm, mesopores having pore diameters from 2 nm to 50 nm, and macropores having pore diameters larger than 50 nm and equal to or smaller than 300 nm. A volume ratio of the micropores and mesopores to the macropore may be 9:1 to 1:5.

In some embodiments, the porous carbon material may have a Raman peak intensity ratio, $I_G/I_D$, of 1 or less, wherein $I_G$ is a peak intensity for a crystalline region and ID is a peak intensity for a non-crystalline region in a Raman spectrum.

In some embodiments, a content of the transition metal may be 1.0 to 20.0 weight percent based on the total weight of the carbon composite.

In some embodiments, the catalyst may be formed on the outer surface and the inner surface of the plurality of pores.

In some embodiments, an average particle size $D_{50}$ of the particle is 1 to 30 times larger than a diameter of a single transition metal atom of the catalyst.

In some embodiments, an average particle size $D_{50}$ of the particle is in a range of from a diameter of the transition metal atom of the catalyst to 30 nm.

In another aspect, the disclosure relates to a method of preparing a carbon composite for an electrode of a battery, and the method may comprise: heat treating a heteroelement doping precursor and a porous carbon which are in contact to form a porous carbon material doped with a heteroelement; and immersing the porous carbon material doped with the heteroelement in a solution containing a transition metal catalyst precursor and a solvent and then removing the solvent.

In some embodiments, the heat treating may be performed at a temperature range of 800° C. to 1,000° C.

In some embodiments, the heteroelement doped in the porous carbon material may comprise S or $SO_2$, or both S and $SO_2$.

In some embodiments, the heteroelement doping precursor may be dibenzyldisulfide (DBDS), sodium bisulfate ($Na_2S_2O_5$), sodium pyrosulfate ($Na_2S_2O_7$), sodium thiosulfate ($Na_2S_2O_3$), thiourea ($CH_4N_2S$), sodium sulfide ($Na_2S$), potassium thiocyanate (KSCN), benzyl mercaptan ($C_7H_8S$), benzothiophene ($C_8H_6S$), dibenzothiophene ($C_{12}H_{18}S$), or a mixture of two or more thereof.

In some embodiments, the solution containing transition metal may comprise: organic solvent; a precursor compound of a non-metal element; and a precursor compound of a transition metal.

In yet another aspect, the disclosure relates to an electrode active material for an electrode of a battery, and the electrode active material may comprise the carbon composite as described above; and a sulfur containing material.

In some embodiments, the sulfur containing material may comprise an elemental sulfur ($S_8$), $Li_2S_n$ where n≥1, disulfide compounds, organosulfur compounds, carbon-sulfur polymers $(C_2S_x)_n$ where x=2.5 to 50 and n≥2, or a mixture of two or more thereof.

In some embodiments, a content ratio of the carbon composite to the sulfur containing material ranges from 1:9 to 9:1 by weight.

In a further aspect, the disclosure relates to an electrode for a battery, and the electrode may comprise the electrode active material as described above.

In some embodiments, the electrode is a positive electrode of a lithium-sulfur battery ("Li—S battery").

In a yet further aspect, the disclosure relates to a battery, which may comprise: a first electrode; a second electrode; a separator between the first electrode and the second electrode; and an electrolyte, and the first electrode is the electrode as described above.

In some embodiments, the second electrode may be a lithium metal electrode.

In yet another aspect, the disclosure relates to a lithium-sulfur battery, which may comprise: a first electrode comprising the above said carbon composite and a sulfur containing material; a second electrode comprising a lithium metal; a separator between the first electrode and the second electrode; and an electrolyte.

The carbon composite according to an exemplary embodiment of the present disclosure provides excellent adsorption of lithium polysulfide (LiPS, $Li_2S_x$, 2≤x≤8), and has improved ion transport and electron transport which are essential for the conversion reaction of lithium polysulfide.

Moreover, the carbon composite has the improved kinetic activity in the redox reaction of sulfur.

Furthermore, the carbon composite provides improved atomic utilization efficiency as catalysts.

Accordingly, a lithium-sulfur battery including the carbon composite as a support for an electrode additive and/or an electrode active material stably provides high performance by inhibiting elution of lithium polysulfide to electrolyte solution and thus improving conversion rate of sulfur.

In particular, the lithium-sulfur battery according to an exemplary embodiment of the present disclosure provides excellent effects in terms of initial capacity, capacity retention with charge and discharge cycles, and energy density of the battery.

It is to be understood that both the foregoing general description and the following detailed description are exemplary and explanatory and are not restrictive of the disclosed embodiments, as claimed.

BRIEF DESCRIPTION OF DRAWINGS

The accompanying drawings, which are incorporated in and constitute a part of this specification, illustrate various exemplary embodiments and together with the description, serve to explain the principles of the disclosed embodiments, and the present disclosure should not be construed as being limited to the accompanying drawings.

DETAILED DESCRIPTION

Figure 1:
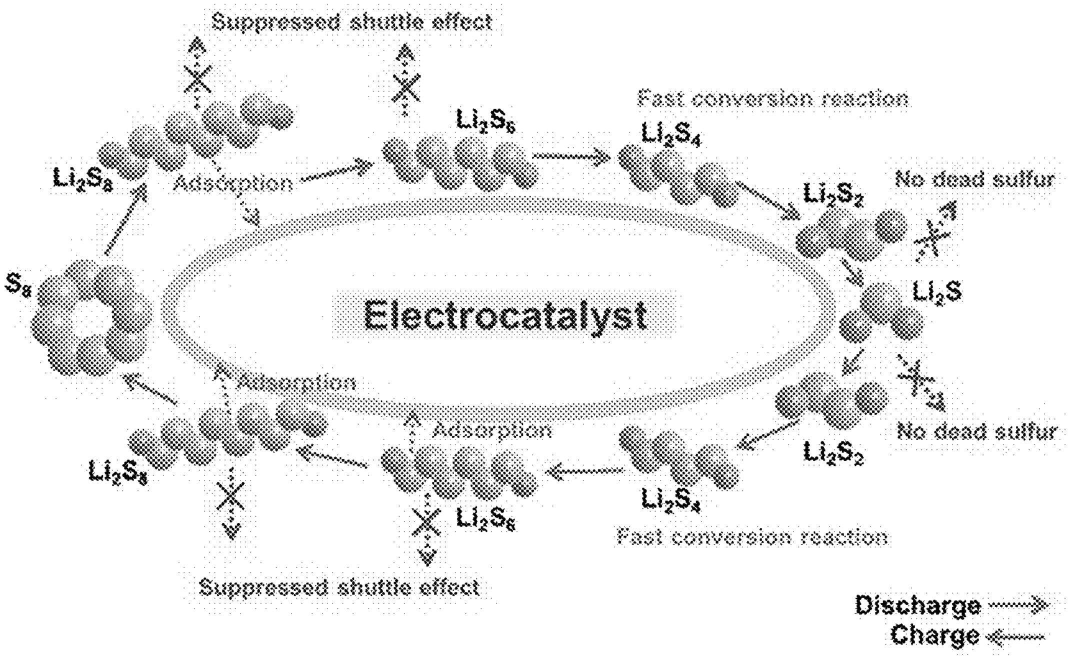
FIG. 1 is a diagram showing various functions of a carbon composite as an electrochemical catalyst according to an exemplary embodiment of the present disclosure in an electrode during charge and discharge of a lithium-sulfur battery.

Further aspects, features, and advantages of the present disclosure will become apparent from the detailed description which follows.

As used herein, the singular forms “a”, “an” and “the” are intended to include the plural forms as well, unless the context clearly indicates otherwise. Additionally, the use of “or” is intended to include “and/or” and not the “exclusive” sense of “either/or” unless the context clearly indicates otherwise.

As used herein, “about” is a term of approximation and is intended to include minor variations in the literally stated amounts, as would be understood by those skilled in the art. Such variations include, for example, standard deviations associated with techniques commonly used to measure the amounts of the constituent elements or components of an alloy or composite material, or other properties and characteristics. All of the values characterized by the above-described modifier “about,” are also intended to include the exact numerical values disclosed herein. Moreover, all ranges include the upper and lower limits.

Any compositions described herein are intended to encompass compositions which consist of, consist essentially of, as well as comprise, the various constituents identified herein, unless explicitly indicated to the contrary.

As used herein, the recitation of a numerical range for a variable is intended to convey that the variable can be equal to any value(s) within that range, as well as any and all sub-ranges encompassed by the broader range. Thus, the variable can be equal to any integer value or values within the numerical range, including the end-points of the range. As an example, a variable which is described as having values between 0 and 10, can be 0, 4, 2 to 6, 2.75, 3.19 to 4.47, etc.

Unless indicated otherwise, each will of the individual features or embodiments of the present specification are combinable with any other individual feature or embodiment that are described herein, without limitation. Such combinations are specifically contemplated as being within the scope of the present disclosure, regardless of whether they are explicitly described as a combination herein.

Technical and scientific terms used herein have the meaning commonly understood by one of skill in the art to which the present description pertains, unless otherwise defined. Reference is made herein to various methodologies and materials known to those of skill in the art.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

The term “exemplary” is used in the sense of “example” rather than “ideal.” The term “or” is meant to be inclusive and means either, any, several, or all of the listed items. The terms “comprises,” “comprising,” “includes,” “including,” or other variations thereof, are intended to cover a nonexclusive inclusion such that a process, method, or product that comprises a list of elements does not necessarily include only those elements, but may include other elements not expressly listed or inherent to such a process, method, article, or apparatus.

In this specification, terms indicating directions such as "upper", "lower", "left", "right", "front", and "rear" are used, but these terms are just for convenience of explanation, and it is obvious to those skilled in the art that these terms may vary depending on the location of an object or the position of an observer.

In the appended drawings, the size of each element or a specific portion constituting the element may be exaggerated, omitted, or schematically illustrated for convenience and clarity of description. Accordingly, the size of each element may not necessarily reflect the actual size. If it is determined that a detailed description of a related known function or configuration may unnecessarily obscure the gist of the present disclosure, such description may be omitted.

According to an aspect of the present disclosure, provided is a carbon composite that can be used as an electrochemical catalyst ("Electrocatalyst" in FIG. 1) in an electrode of a battery, in particular, in a positive electrode of a lithium-sulfur battery.

FIG. 1 is a diagram showing various functions of the carbon composite as an electrochemical catalyst according to the present disclosure in the positive electrode during charge and discharge of the lithium-sulfur battery. Referring to FIG. 1, the carbon composite may be used as an electrocatalyst in the positive electrode to adsorb lithium polysulfide ($Li_2S_x$ or $LiS_x^-$, x=8, 6, 4, 2), thereby inhibiting elution of lithium polysulfide into electrolyte solution and suppressing the shuttle effect. In addition, the carbon composite may have catalytic activity in the conversion reaction of lithium polysulfide to induce fast conversion reaction and prevent loss of lithium sulfide ($Li_2S$), thereby "no dead sulfur" occurs.

The carbon composite according to an aspect of the present disclosure comprises a porous carbon material including an outer surface and pores comprising an inner surface, the porous carbon material being doped with a heteroelement, and a catalyst comprising a transition metal formed on the outer surface or the inner surface of at least a plurality of the pores.

In an exemplary embodiment of the present disclosure, the catalyst comprising a transition metal may be chemically and/or physically bonded to at least one of the outer surface of the porous carbon material doped with a heteroelement or the inner surface of the pores in the porous carbon material.

In an exemplary embodiment, the catalyst may be physically adsorbed to the outer surface of the porous carbon material and/or the inner surface of the pores in the porous carbon material, and/or may be chemically bonded via covalent bonding between the element contained in the catalyst and carbon of the porous carbon material.

In an exemplary embodiment, the heteroelement may comprise oxygen, phosphorus, boron, or sulfur, and preferably comprise sulfur.

In the carbon composite according to an exemplary embodiment, the heteroelement, for example, sulfur, exists at a location adjacent to the catalyst on the outer surface of the porous carbon material and/or inside the pores. In the present specification, the "adjacent" location refers to a location at which a distance between a transition metal atom of the catalyst closest to a neighboring heteroelement doped in the porous carbon material and the neighboring heteroelement is 10 nm or less.

In an exemplary embodiment, the distance between a transition metal atom of the catalyst closest to a neighboring heteroelement doped in the porous carbon material and the neighboring heteroelement is 2 nm or less.

In the specification, the distance between a transition metal atom of the catalyst closest to a neighboring heteroelement doped in the porous carbon material and the neighboring heteroelement refers to an interatomic distance between the centers of two nearest neighboring atoms of the transition metal and the neighboring heteroelement respectively. The interatomic distance can be measured by known methods for measuring a distance between atoms, and the measurement method is not limited to a particular method. For example, the interatomic distance may be measured by transmission electron microscopy (TEM), atomic force microscopy (AFM), field-emission electron microscopy or laser diffraction spectroscopy.

In an exemplary embodiment of the present disclosure, the distance between a transition metal atom of the catalyst closest to a neighboring heteroelement doped in the porous carbon material and the neighboring heteroelement may be 10 nm or less, specifically 5 nm or less, and more specifically 2 nm or less, and may be, for example, 1.5 nm or less or 1 nm or less.

For example, when the catalyst comprises iron (Fe) as the transition metal, and when the carbon composite is doped with sulfur (S), the interatomic distance between the catalyst and the heteroelement doped in the porous carbon material may refer to the interatomic distance between iron (Fe) atom contained in the catalyst and nearest sulfur (S) atom doped in the porous carbon material.

In the carbon composite of an exemplary embodiment, the site at which the heteroelement is doped may act as an electron-exchangeable binding (EEB) site. Additionally, the heteroelement, for example, sulfur, may modulate the orbital level of the transition metal via electron exchange with the transition metal in the catalyst. For example, when iron (Fe) is contained in the catalyst as the transition metal, sulfur (S) may modulate the d-orbital level of iron via electron exchange with iron (Fe). Accordingly, the carbon composite may promote the kinetic activity in the reduction reaction of lithium sulfide, but the mechanism of the present disclosure is not limited thereto.

In an exemplary embodiment of the present disclosure, the transition metal-containing catalyst may be used alone in the positive electrode of the lithium-sulfur battery to activate the reduction reaction of lithium polysulfide. However, when the catalyst is present on the outer surface of the porous carbon material doped with the heteroelement such as sulfur and/or the inner surface of the pores in the porous carbon material according to the present disclosure, the adsorption of lithium polysulfide and the activity in the redox reaction of sulfur can be enhanced.

In an exemplary embodiment of the present disclosure, the catalyst may be any type of catalyst that contains a transition metal as an active component and can catalyze the redox reaction of sulfur.

In another exemplary embodiment of the present disclosure, the catalyst may comprise the transition metal and a non-metal element that forms a ligand with the transition metal. The transition metal and/or non-metal element present in the catalyst may be physically adsorbed and/or chemically bonded to carbon of the porous carbon material.

In yet another exemplary embodiment of the present disclosure, the catalyst may comprise the transition metal, the non-metal element that forms a ligand with the transition metal, and an organic support. When the catalyst further contains the organic support for supporting the transition metal and the non-metal element, dispersion of the transition metal is improved, thereby improving the catalyst utilization efficiency of the carbon composite according to an aspect of the present disclosure.

In a further exemplary embodiment of the present disclosure, when the catalyst comprises the organic support, the transition metal and the non-metal element that forms a ligand with the transition metal, the catalyst may include bonding between the carbon in the organic support and the transition metal, bonding between the carbon atom and the non-metal element, and bonding between the transition metal and the non-metal element.

In an exemplary embodiment of the present disclosure, the catalyst may comprise the transition metal in the form of metal particles formed through bonding between transition metal atoms, but in terms of the atomic utilization efficiency of the catalyst, the catalyst preferably comprises the transition metal present as single atoms without bonding between transition metal atoms.

Accordingly, in an exemplary embodiment of the present disclosure, the catalyst may comprise single atom catalysts containing a transition metal. Accordingly, the transition metal contained in the catalyst may be dispersed in the carbon composite at single atomic scale.

The 'single atom catalysts (SACs)' as used herein are catalysts having catalytic activity at atomic scale, and the carbon composite may comprise the single atom catalysts containing transition metal as the catalyst.

In an exemplary embodiment of the present disclosure, the catalyst may not comprise metallic bonding between transition metals in its structure. That is, the catalyst may not comprise metal particles formed through metallic bonding between two or more transition metal atoms in its structure. Specifically, the carbon composite according to an exemplary embodiment of the present disclosure does not comprise metallic bonding between two or more transition metal atoms included in the catalyst.

In an exemplary embodiment of the present disclosure, the transition metal dispersed in the porous carbon material and/or the organic support at single atomic scale may be identified by observing the carbon composite and/or the catalyst through microscopy, for example, scanning electron microscopy (SEM), transmission electron microscopy (TEM) and scanning transmission electron microscopy (STEM).

In another exemplary embodiment of the present disclosure, the catalyst contained in the carbon composite may comprise particles containing a transition metal, and an average particle size $D_{50}$ of the particles may be 1 to 30 times larger than a diameter of a transition metal atom. Specifically, the average particle size $D_{50}$ of the particles may be 1 to 5 times larger than the diameter of the transition metal atom. Preferably, the average size $D_{50}$ of the particles may be 1 to 3 times, and more preferably 1 time larger than the diameter of the transition metal atom. That is, in the catalyst, most preferably, the transition metal may be dispersed in the carbon composite in single atomic scale.

In yet another exemplary embodiment of the present disclosure, the average particle size of the particle is in a range of from the diameter of a transition metal atom to 30 nm.

In an exemplary embodiment of the present disclosure, the catalyst with no metallic bonding between two or more transition metal atoms may be identified by X-ray diffraction (XRD) analysis of the carbon composite and/or the catalyst.

In an exemplary embodiment of the present disclosure, the transition metal contained in the catalyst is not limited to a particular type, but may include any transition metal capable of activating the redox reaction of the heteroelement, preferably sulfur, in the electrode of the battery, in particular the positive electrode of the lithium-sulfur battery, for example, at least one of zinc (Zn), vanadium (V), chromium (Cr), manganese (Mn), iron (Fe), cobalt (Co), nickel (Ni), copper (Cu), zirconium (Zr), niobium (Nb), molybdenum (Mo), technetium (Tc), rubidium (Ru), rhodium (Rh), palladium (Pd), silver (Ag), cadmium (Cd), lanthanum (La), hafnium (Hf), tantalum (Ta), tungsten (W), osmium (Os), iridium (Ir), cerium (Ce), gadolinium (Gd), scandium (Sc), titanium (Ti), gallium (Ga) and indium (In).

In another exemplary embodiment of the present disclosure, the transition metal contained in the catalyst may be iron (Fe).

Tt is known that an iron (Fe) atom has a diameter of 300 μm. In an exemplary embodiment of the present disclosure, when iron (Fe) is included in the catalyst in the carbon composite, the diameter $D_{50}$ of the transition metal present in the carbon composite may be found to be 0.3 to 5 nm. For example, diameter $D_{50}$ of the iron contained in the carbon composite may be 0.5 to 2 nm, 0.3 to 1.5 nm, 0.3 to 1 nm, or 0.3 to 0.5 nm.

In an exemplary embodiment of the present disclosure, the non-metal element that forms a ligand with the transition metal in the catalyst may be appropriately selected depending on the transition metal, and is not limited to a particular type.

In another exemplary embodiment of the present disclosure, the non-metal element that forms a ligand with the transition metal in the catalyst may be one or more selected from the group consisting of hydrogen (H), boron (B), nitrogen (N), oxygen (O), fluorine (F), neon (Ne), silicon (Si), phosphorus (P), chlorine (Cl), bromine (Br), and iodine (I).

In yet another exemplary embodiment of the present disclosure, when the catalyst comprises iron (Fe) as the transition metal, the catalyst may comprise nitrogen (N) as the non-metal element. When iron and nitrogen form a ligand in the catalyst, the catalyst may have improved catalytic activity, but the present disclosure is not limited thereto.

In an exemplary embodiment of the present disclosure, when the catalyst comprises iron (Fe) as the transition metal and nitrogen (N) as the non-metal element, the catalyst may include a structure in which one iron (Fe) atom is bonded to four nitrogen (N) atoms adjacent to the iron (Fe) atom. When the catalyst includes a structure in which one iron (Fe) atom is bonded to four adjacent nitrogen (N) atoms, the carbon composite may have improved catalytic activity stability, but the present disclosure is not limited thereto.

As described above, as the catalyst is disposed in the outer surface the porous carbon material doped with an heteroelement, e.g., sulfur, and/or the inner surface of the pores in the carbon material, the carbon composite according to the present disclosure may have improved catalytic activity in the redox reaction of sulfur.

In an exemplary embodiment of the present disclosure, the porous carbon material doped with sulfur may be obtained by doping sulfur in porous carbon materials made by carbonizing various carbon precursors.

The porous carbon materials made by carbonizing various carbon precursors are not limited to a particular type and may include any type of porous carbon material commonly used in the corresponding technical field. For example, the porous carbon material may include one or more selected from the group consisting of graphite; graphene; reduced graphene oxide (rGO); carbon black including denka black, acetylene black, ketjen black, channel black, furnace black, lamp black, thermal black; carbon nanotubes (CNTs) including single-walled carbon nanotubes (SWCNTs) and multi-walled carbon nanotubes (MWCNTs); carbon fibers including graphite nanofibers (GNFs), carbon nanofibers (CNFs) and activated carbon fibers (ACFs); graphite including natural graphite, artificial graphite and expandable graphite; fullerene; and activated carbon obtained by the activation of carbon materials.

According to the present disclosure, when the porous carbon material is doped with sulfur, one or more sulfur elements are doped in the porous carbon material of the carbon composite. The porous carbon material doped with the one or more sulfur elements has a structure in which one or more carbon atoms of the porous carbon material are replaced by sulfur.

In an exemplary embodiment of the present disclosure, the heteroelement, e.g., sulfur, doped in the porous carbon material may be present in such an amount that a molar ratio of the heteroelement doped in the porous carbon material to the transition metal contained in the catalyst is 0.5:1 to 8:1. Specifically, the molar ratio of the heteroelement doped in the porous carbon material to the transition metal contained in the catalyst may be 0.5:1 to 5:1 or 1:1 to 3:1. When the molar ratio between the transition metal and the heteroelement is in the above-described range, catalytic activity may be improved, but the present disclosure is not limited thereto.

For example, when the heteroelement is sulfur, the molar ratio of the sulfur doped in the porous carbon material to the transition metal in the catalyst may be measured by inductively coupled plasma-mass spectrometry (ICP) elemental analysis. When the amount of the sulfur doped is a very small amount, high resolution equipment may be used for measurement accuracy, but the present disclosure is not limited thereto.

In an exemplary embodiment of the present disclosure, when the heteroelement is sulfur, the sulfur may be doped in the form of a sulfur atom (S) or a sulfur oxide ($SO_x$) where $0.1 \leq x \leq 4$.

Specifically, when the sulfur is doped in the form of a sulfur atom, a carbon atom in the porous carbon material is replaced by the sulfur atom to form —C—S—C— structure. Additionally, when the sulfur is doped in the form of sulfur oxide, a carbon atom in the porous carbon material is replaced by the sulfur oxide to form —C—$SO_x$C— structure.

In an exemplary embodiment of the present disclosure, the porous carbon material doped with sulfur may include a structure in which the sulfur is doped in the form of sulfur dioxide ($SO_2$). Specifically, the porous carbon material doped with the sulfur may include a —C—$SO_2$—C— structure in its structure.

In an exemplary embodiment of the present disclosure, the porous carbon material doped with sulfur may include a structure in which the sulfur is doped in the form of a sulfur atom, —C—S—C— structure, and a structure in which the sulfur is doped in the form of sulfur dioxide ($SO_2$), —C—$SO_2$—C— structure.

In the carbon composite according to an exemplary embodiment of the present disclosure, when the heteroelement is sulfur, the sulfur may modulate the orbital level of the transition metal present in the catalyst, and for example, electron transfer may take place between the site where the sulfur is doped (i.e., EEB site) and the transition metal.

In this instance, the order of orbital levels of the transition metal and the EEB site is determined according to the type of the transition metal, and the transition metal may act as an electron donor and the EEB site may act as an electron acceptor, or the transition metal may act as an electron acceptor and the EEB site may act as an electron donor.

In an exemplary embodiment of the present disclosure, the carbon composite may comprise iron (Fe) as the transition metal in the catalyst, and may include the —C—S—C— structure and the —C—$SO_2$—C— structure in the porous carbon material doped with sulfur. In this instance, the role of the transition metal and the EEB site as the electron donor and/or acceptor may be determined according to a ratio of the —C—S—C— structure and the —C—$SO_2$—C— structure at a possible coordinate bonding site with the transition metal in one catalyst.

In an exemplary embodiment of the present disclosure, the electron donor/acceptor relationship between the transition metal and the EEB site may be identified by their orbital level measurements, but the present disclosure is not limited thereto.

For example, when the orbital level of the transition metal having catalytic activity in the carbon composite is low, electrons are transferred from the transition metal to the EEB site, or when the orbital level of the transition is high, electrons are transferred from the EEB site to the transition metal.

In an exemplary embodiment of the present disclosure, when the ratio of the —C—$SO_2$—C— structure to the —C—S—C— structure is high, the d orbital of iron (Fe) is stabilized by $SO_2$ and the Fe d orbital level decreases, thereby allowing electron transfer from the iron to the EEB site.

In another exemplary embodiment of the present disclosure, when the ratio of the —C—$SO_2$—C— structure to the —C—S—C— structure is low, the stabilization effect reduces and the Fe d orbital level increases, thereby allowing electron transfer from the EEB site to the iron.

In the specification, the ratio of the —C—$SO_2$—C— structure to the —C—S—C— structure may be, for example, a molar ratio of $SO_2$ to S.

In an exemplary embodiment of the present disclosure, when the transition metal in the catalyst of the carbon composite comprises iron (Fe), the catalytic activity may be further improved by the electron transfer from the EEB site to the iron (Fe), and accordingly, the ratio of the —C—$SO_2$—C— structure to the —C—S—C— structure (the molar ratio of $SO_2$ to S) in the structure of the porous carbon material doped with sulfur may be preferably 1 or less. For example, the molar ratio of $SO_2$ to S may be 1 or less, 0.9 or less, 0.8 or less, 0.7 or less, 0.6 or less, 0.5 or less, 0.4 or less, 0.3 or less, 0.2 or less, or 0.15 or less. In addition, the ratio of first structure/second structure may be 0.01 or more, 0.05 or more, or 0.1 or more. For example, the ratio of first structure/second structure may be 0.01 or more and 1 or less, 0.05 or more and 0.8 or less, 0.10 or more and 0.7 or less, 0.10 or more and 0.5 or less, or 0.10 or more and 0.2 or less, but the present disclosure is not limited thereto.

The carbon composite according to an aspect of the present disclosure comprises a plurality of pores to impregnate an electrode active material and/or the catalyst in the carbon composite. For example, when the carbon composite is used in a positive electrode, a positive electrode active material and/or the catalyst are/is impregnated in the pores.

In an exemplary embodiment of the present disclosure, the pores of the porous carbon material may comprise micropores having pore diameters equal to or larger than 0.2 nm and smaller than 2 nm, mesopores having pore diameters from 2 nm to 50 nm, and macropores having pore diameters larger than 50 nm and equal to or smaller than 300 nm, and a volume ratio of the micropores and mesopores to the macropore may be 9:1 to 1:5.

In an exemplary embodiment of the present disclosure, the total pore volume of the carbon composite may be 1 to 10 $cm^3/g$. Specifically, the total pore volume of the carbon composite may be 1 to 10 $cm^3/g$, 2 to 8 $cm^3/g$, 3 to 6 $cm^3/g$, 4 to 5 $cm^3/g$, 1 to 3 $cm^3/g$, or 1 to 2 $cm^3/g$, but is not limited thereto. The total pore volume may be obtained through $N_2$ isotherm analysis based on the adsorption of liquid nitrogen.

In another exemplary embodiment of the present disclosure, the pores of the porous carbon material can be divided in two groups, nanopores having pore diameters of less than 10 nm and meso-macropores having pore diameters of 10 nm or more. The pore diameters of the nanopores may be less than 10 nm, specifically, 1 to 9.5 nm, 2 to 9 nm, 3 to 8 nm, 3.5 to 7 nm, 4 to 6 nm, 4 to 5 nm or 4.0 to 4.5 nm. The pore diameters of the meso-macropores may be 10 nm or more, specifically, 10 nm or more and 50 nm or less, 40 nm or less, 30 nm or less, or 20 nm or less. More specifically, the pore diameters of the meso-macropores may be 10 to 19 nm, 10 to 18 nm, 12 to 18 nm, 13 to 17 nm or 14 to 15 nm.

The pore diameters may be measured by the method commonly used in the technical filed and is not limited to a particular method. For example, the pore diameters may be measured by scanning electron microscopy (SEM), field-emission electron microscopy or laser diffraction. The measurement using the laser diffraction method may be, for example, performed using commercially available laser diffraction particle size analyzer (e.g., Microtrac MT 3000). The pre diameter may refer to an average diameter D50 at 50% of particle size distribution.

In an exemplary embodiment of the present disclosure, when the total number of meso-macropores is larger than the total number of nanopores, the carbon composite may exhibit more favorable effects on the catalytic activation of the conversion reaction of lithium polysulfide.

In another exemplary embodiment of the present disclosure, when the number of pores having pore diameter of less than 10 nm is N(nano) and the number of pores having pore diameter of 10 nm or more is N(meso-macro) among all the pores in the carbon composite, a ratio of N(meso-macro) to N(nano) [a ratio of N(meso-macro)/N(nano)] may be 1 or more.

In an exemplary embodiment of the present disclosure, an average particle size $D_{50}$ of the carbon composite may be 0.5 to 200 μm, 1 to 150 μm, or 10 to 150 μm.

In an exemplary embodiment of the present disclosure, BET specific surface area of the carbon composite may be 200 $m^2/g$ or more, but is not limited thereto.

Specifically, the BET specific surface area of the carbon composite may be, for example, 200 $m^2/g$ or more, 300 $m^2/g$ or more, 400 $m^2/g$ or more, 500 $m^2/g$ or more, 600 $m^2/g$ or more, or 700 $m^2/g$ or more, and 1,500 $m^2/g$ or less, 1,000 $m^2/g$ or less, 900 $m^2/g$ or less, 800 $m^2/g$ or less, 780 $m^2/g$ or less, or 750 $m^2/g$ or less, but its upper limit is not limited thereto.

In an exemplary embodiment of the present disclosure, the carbon composite according to the present disclosure comprises a plurality of pores, and the catalyst supported thereon may comprise the transition metal dispersed in the porous carbon material and/or the organic support in single atomic scale, thereby providing a substantially large specific surface area.

The BET specific surface area may be measured by BET method, and may indicate a value measured by the known method for measuring BET specific surface area. For example, the BET specific surface area may be a value calculated from the volume of nitrogen gas adsorbed under the liquid nitrogen temperature (77 K) using BELSORP-mino II from BEL Japan.

In an exemplary embodiment of the present disclosure, the carbon composite may have a Raman peak intensity ratio ($I_G/I_D$) of 1 or less. For example, the $I_G/I_D$ ratio may be 0.1 to 1, 0.5 to 1, or 0.8 to 1.0. When the $I_G/I_D$ ratio is in the above-described range, the support efficiency of the catalyst on the porous carbon material and/or the sulfur doping efficiency may be improved, but the present disclosure is not limited thereto.

The Raman peak intensity ratio may be measured through $I_G$ and $I_D$ values obtained from the spectrum of the carbon composite obtained through Raman spectroscopy. In the obtained spectrum, $I_G$ refers to the peak of the crystalline portion (G-peak, 1573/cm) and $I_D$ refers to the peak of the amorphous portion (D-peak, 1309/cm). Accordingly, a smaller $I_G/I_D$ ratio indicates lower crystallinity.

In an exemplary embodiment of the present disclosure, the amount of the transition metal in the carbon composite may be 1 to 20 weight percent (wt %), and specifically 1 to 10 wt %, based on the total weight of the carbon composite. When the amount of the transition metal is in the above-described range, the carbon composite may have improved catalytic effect and increased specific surface area due to improved dispersion of the transition metal in single atomic scale. When the amount of the transition metal in the carbon composite is outside of the above-described range, the carbon composite may comprise the transition metal in the form of metal particles through metallic bonding between transition metals.

In an exemplary embodiment of the present disclosure, the amount of the sulfur, as the heteroelement, in the carbon composite may be 0.1 to 10 wt %, and specifically 1 to 5 wt %, based on the total weight of the carbon composite. When the amount of the sulfur is in the above-described range, the catalytic efficiency of the transition metal may be enhanced.

In another exemplary embodiment of the present disclosure, as described above, the carbon composite may comprise iron as the transition metal and the catalyst may have a structure in which the iron is dispersed on the organic support at single atomic scale, and the iron forms a ligand together with four adjacent nitrogen atoms. When this structure is represented as $Fe—N_4$, the sulfur doped in the porous carbon material may be near $Fe—N_4$, and the sulfur that can form a coordinate bond with the iron of the $Fe—N_4$ may exist as $—C—SO_2—C—$ and/or —C—S—C— structure. As described above, the ratio of $—C—SO_2—C—$/—C—S—C— structure may be 1 or less, and specifically, may be 0.1 to 0.7. The amount of the sulfur in the carbon composite may be determined in a range that satisfies the above-described ratio. As described above, the ratio of $—C—SO_2—C—$/—C—S—C— structure may indicate the molar ratio of $SO_2$ to S in the carbon composite.

In this instance, the molar ratio of $SO_2$ to S may be, for example, 1 or less, 0.9 or less, 0.8 or less, 0.7 or less, 0.6 or less, 0.5 or less, 0.4 or less, 0.3 or less, 0.2 or less, or 0.15 or less. In addition, the ratio of first structure/second structure may be, for example, 0.01 or more, 0.05 or more, or 0.1 or more. For example, the ratio of first structure/second structure may be 0.01 or more and 1 or less, 0.05 or more and 0.8 or less, 0.10 or more and 0.7 or less, 0.10 or more and 0.5 or less, or 0.10 or more and 0.2 or less, but the present disclosure is not limited thereto.

In one aspect, when the carbon composite of an embodiment of the present disclosure is used in a positive electrode of a lithium-sulfur battery, the carbon composite may enhance battery efficiency through the heteroelement, e.g., sulfur, present near the transition metal-containing catalyst, exchange electrons with the transition metal, and at the same time, providing an additional binding site to lithium polysulfide, but the present disclosure is not limited thereto.

In an exemplary embodiment of the present disclosure, the carbon composite may be used as a positive electrode active material by combining the carbon composite and sulfur containing material to impregnate the sulfur containing material therein, or the carbon composite may replace a conductive material.

In particular, the carbon composite of the present disclosure may have a significant improvement in atomic utilization efficiency by dispersion of the transition metal in single atomic scale, but the present disclosure is not limited thereto.

Another aspect of the present disclosure provides a method for manufacturing the carbon composite. The method comprises: (S1) heat treating a heteroelement doping precursor and a porous carbon which are in contact to form a porous carbon material doped with a heteroelement; and (S2) immersing the porous carbon material doped with the heteroelement in a solution containing a transition metal catalyst precursor and a solvent and then removing the solvent.

In an exemplary embodiment of the present disclosure, the heteroelement is sulfur, and the step (S1) comprises doping the sulfur in the porous carbon material to form an electron-exchangeable binding (EEB) site for the catalyst.

In an exemplary embodiment of the present disclosure, the step (S1) may comprise impregnating the porous carbon material in a sulfur-containing solution comprising the sulfur-doping precursor and performing the heat treatment.

In an exemplary embodiment of the present disclosure, the step (S1) may comprise impregnating the porous carbon material in the sulfur-containing solution, grinding until the solvent evaporates and performing the thermal treatment, but the present disclosure is not limited thereto.

In an exemplary embodiment of the present disclosure, the impregnation of the porous carbon material in the sulfur-containing solution may be performed through dipping or immersion of the porous carbon material in the sulfur-containing solution, but is not limited thereto.

In an exemplary embodiment of the present disclosure, the heat treatment in the step (S1) may be performed at 800 to 1,000° C. to achieve a low ratio of —C—$SO_2$—C—/—C—S—C— structure at the EEB site.

In an exemplary embodiment of the present disclosure, the heat treatment may involve increasing the temperature while uniformly maintaining temperature increasing rate selected from the range of 2 to 10° C./min.

In an exemplary embodiment of the present disclosure, the heat treatment may be performed at temperature increasing rate of 5° C./min.

In an exemplary embodiment of the present disclosure, sulfur may be uniformly doped in the porous carbon through grinding and heat treatment with the porous carbon material and the sulfur-containing solution brought into contact with each other, resulting in the uniform EEB site in the porous carbon, and accordingly, the catalyst as described below may include uniform dispersion of the transition metal in single atomic scale, but the present disclosure is not limited thereto.

The sulfur-containing solution may be a solution in which the sulfur-doping precursor is dissolved in the solvent, and the sulfur-doping precursor may be, for example, one or more selected from the group consisting of dibenzyl disulfide (DBDS), sodium metabisulfite ($Na_2S_2O_5$), sodium pyrosulfate ($Na_2S_2O_7$), sodium thiosulfate ($Na_2S_2O_3$), thiourea ($CH_4N_2S$), sodium sulfide ($Na_2S$), potassium thiocyanate (KSCN), benzyl mercaptan ($C_7H_8S$), benzothiophene ($C_8H_{16}S$) and dibenzohiophene ($C_{12}H_8S$). The solvent may be appropriately selected from solvents for the sulfur-doping precursor with high wettability on the porous carbon material, but is not limited thereto.

According to an exemplary embodiment of the present disclosure, form and structure of the sulfur doped in the porous carbon material may vary depending on the type of the sulfur-doping precursor. Since the sulfur acts as the EEB site, in terms of the electron-rich transition metal, the sulfur may be doped using dibenzyl disulfide dissolved in an alcohol-based solvent such as ethanol.

According to an exemplary embodiment of the present disclosure, the sulfur may be doped using dibenzyl disulfide, and in this instance, the ratio of —C—$SO_2$—C—/—C—S—C— structure in the prepared carbon composite may be 0.1 to 0.5.

According to another exemplary embodiment of the present disclosure, the sulfur may be doped using sodium metabisulfite, and in this instance, the ratio of —C—$SO_2$—C—/—C—S—C— structure in the carbon composite may be 0.5 to 1.

The step ($S_2$) may comprise preparing a precursor solution to produce the catalyst supported on the porous carbon material doped with sulfur.

In an exemplary embodiment of the present disclosure, the transition metal-containing precursor solution may be a precursor solution for producing the catalyst, and may comprise an organic solvent and a precursor compound of the transition metal.

In an exemplary embodiment of the present disclosure, the transition metal-containing precursor solution may be a precursor solution for making the catalyst, and may comprise an organic solvent, a precursor compound of a non-metal element and a precursor compound of the transition metal.

In an exemplary embodiment of the present disclosure, the precursor compound of the transition metal may be oxide of the transition metal, halide of the transition metal, acetate of the transition metal, nitrate of the transition metal, sulfate of the transition metal, cyanide of the transition metal, saturated or unsaturated carbon chain fatty acid salt of the transition metal, saturated or unsaturated carbon chain phosphonate of the transition metal, or a mixture of two or more thereof.

In an exemplary embodiment of the present disclosure, a halide of the transition metal may be fluoride of the transition metal, chloride of the transition metal, bromide of the transition metal or iodide of the transition metal.

In another exemplary embodiment of the present disclosure, the precursor solution may comprise iron trichloride ($FeCl_3$), ferrocene, iron acetylacetonate, iron nitrate, ferrous sulfate, potassium iron ferricyanide, or a mixture of two or more thereof.

In an exemplary embodiment of the present disclosure, the precursor compound of a non-metal element may be an organic compound containing the non-metal element.

In an exemplary embodiment of the present disclosure, the organic compound containing the non-metal element is a compound containing the above-described non-metal element. The non-metal element may be, for example, nitrogen (N), and the organic compound containing nitrogen may be, for example, 1,10-phenanthroline, polyaniline, polydopamine, melamine, carbon nitride (g-CN), phenylenediamine, or a mixture of two or more thereof.

In an exemplary embodiment of the present disclosure, the organic solvent may be appropriately selected from solvents for the organic compound containing the non-metal element and the halide of the transition metal, but is not limited thereto.

In an exemplary embodiment of the present disclosure, a molar ratio of the precursor compound of the non-metal element and the halide of the transition metal in the precursor solution may be 50:1 to 1:1, 40:1 to 1:1, 20:1 to 1:1, 10:1 to 1:1 or 5:1 to 1:1, but is not limited thereto.

In an exemplary embodiment of the present disclosure, the molar ratio of the precursor compound of the non-metal element and the halide of the transition metal in the precursor solution may be 4:1.

In an exemplary embodiment of the present disclosure, the method may further comprise, before the step (S2), preparing the transition metal-containing precursor solution. In this instance, the step of preparing the transition metal-containing precursor solution may be performed in any order with respect to the step (S1). For example, the step of preparing the transition metal-containing precursor solution may be performed after the step (S1), the step (S1) may be performed after preparing the transition metal-containing precursor solution, or the step (S1) and the step of preparing the transition metal-containing precursor solution may be performed at the same time. As described above, sequence of the step (S1) and the step of preparing the transition metal-containing precursor solution is not limited to a particular order.

The step (S2) is performed to dispose the catalyst containing transition metal on at least one of the outer surface of the porous carbon material doped with the heteroelement, e.g., sulfur, prepared in the step (S1) or the inner surface of the pores in the porous carbon material.

To this end, the step (S2) comprises impregnating the product of the step (S1) in the transition metal-containing precursor solution and removing the solvent.

In an exemplary embodiment of the present disclosure, the step (S2) may comprise impregnating the product of the step (S1) in the transition metal-containing precursor solution, grinding and removing the solvent by drying. The drying may be performed, for example, at 70 to 100° C., but is not limited thereto.

In another exemplary embodiment of the present disclosure, the method may further comprise heat treatment at 800 to 1,000° C. after the removing the solvent in the step (S2).

In an exemplary embodiment of the present disclosure, the method may further comprise, after the step (S2), (S3) cooling the product obtained from the step (S2) at room temperature and performing acid treatment.

According to the above-described method, it is possible to manufacture the carbon composite comprising the porous carbon material doped with heteroelement, e.g., sulfur, and at least one catalyst containing at least one transition metal, wherein the catalyst is disposed on at least one of the outer surface of the porous carbon material doped with sulfur or the inner surface of the pores in the porous carbon material.

According to another aspect of the present disclosure, provided herein is an electrode comprising an electrode active material comprising the carbon composite. In particular, in an exemplary embodiment, a positive electrode comprising a positive electrode active material comprising the carbon composite and a sulfur containing material may be provided.

The positive electrode may comprise a composite of the carbon composite as a support for the sulfur containing material, the composite as the positive electrode active material.

In an exemplary embodiment of the present disclosure, the sulfur containing material may be sulfur ($S_8$), lithium sulfide ($Li_2S$), lithium polysulfide ($Li_2S_x$, $2 \leq x \leq 8$), a disulfide compound, or a mixture of two or more thereof, but is limited thereto.

In an exemplary embodiment of the present disclosure, contents of the carbon composite and the sulfur containing material are determined according to the amount of sulfur in the carbon composite and the type of the sulfur containing material, and are not particularly limited. For example, the carbon composite and the sulfur containing material may be mixed at a content ratio of 1:9 to 9:1. Specifically, the content ratio may be 1:9 to 5:5, and more specifically 2:8 to 4:6.

In an exemplary embodiment of the present disclosure, the positive electrode active material may be formed by mixing the carbon composite with the sulfur containing material, followed by heat treatment. The heat treatment may be performed, for example, at 130 to 180° C., and specifically 150 to 160° C.

In an exemplary embodiment of the present disclosure, in addition to the positive electrode active material comprising the carbon composite and the sulfur containing material, the positive electrode for a lithium-sulfur battery may further comprise a binder. The binder is not limited to a particular type and may include any type of binder that can be used in positive electrodes of lithium-sulfur batteries.

In another exemplary embodiment of the present disclosure, in addition to the positive electrode active material and the binder, the positive electrode for a lithium-sulfur battery may further comprise a conductive material and an additive. In this instance, the binder, the conductive material and the additive include those commonly used in the technical field.

In another exemplary embodiment of the present disclosure, the positive electrode for a lithium-sulfur battery may comprise a positive electrode current collector having a first side and a second side, and a positive electrode active material layer including the positive electrode material and the binder and coated on at least one of the first side or the second side of the current collector.

In this instance, the positive electrode current collector is not limited to a particular type and may include any type of positive electrode current collector that does not cause any chemical change to the corresponding battery and that is highly conductive.

In an exemplary embodiment of the present disclosure, the positive electrode comprising the carbon composite may provide effects of improved initial capacity and cycling stability, but the effects of the present disclosure are not limited thereto.

In an exemplary embodiment of the present disclosure, the positive electrode for a lithium-sulfur battery may have a loading amount of sulfur(S) of 1.0 $mg/cm^2$ or more. For example, the loading amount of sulfur in the positive electrode for a lithium-sulfur battery may be 1 $mg/cm^2$ or more, 1.5 $mg/cm^2$ or more or 2 $mg/cm^2$ or more. In an exemplary embodiment, the loading amount of sulfur in the positive electrode for a lithium-sulfur battery may be 2 to 10 $mg/cm^2$, and improved operational stability may be obtained.

In yet further aspect, the present disclosure relates to a battery comprising a first electrode; a second electrode; a separator between the first electrode and the second electrode; and an electrolyte, the first electrode comprising the carbon composite as described above and the sulfur containing material as an electrode active material.

In an exemplary embodiment, the second electrode may be a lithium metal electrode.

In yet another aspect, the disclosure relates to a lithium-sulfur battery, which may comprise: a first electrode comprising the carbon composite and a sulfur containing material as an electrode active material; a second electrode comprising a lithium metal; a separator between the first electrode and the second electrode; and an electrolyte. In the lithium sulfur battery, the first electrode may be a positive electrode, and the second electrode may be a negative electrode.

In an exemplary embodiment of the present disclosure, the negative electrode, the separator and the electrolyte are not limited to particular types and may include any type that can be used in lithium-sulfur batteries without departing from the scope of the present disclosure.

In exemplary embodiments of the present disclosure, the lithium-sulfur battery may be coin-type, cylindrical, pouch-type or prismatic, but is not limited thereto. In addition, the lithium-sulfur battery may be applied to not only a battery cell used as a power source for small devices but also a unit cell of a medium- or large-sized battery module comprising multiple battery cells, and its application is not limited thereto.

In an exemplary embodiment of the present disclosure, the lithium-sulfur battery including the positive electrode comprising the carbon composite according to the present disclosure may have effects of improved initial capacity and cycling stability as well as improved energy density of the battery, but the effects of the present disclosure are not limited thereto.

In an exemplary embodiment of the present disclosure, the lithium-sulfur battery may provide an effect of significantly improved energy density by increasing the sulfur loading in the electrode and reducing the amount of the electrolyte solution, but the effect of the present disclosure is not limited thereto.

In an exemplary embodiment of the present disclosure, the lithium-sulfur battery may have an electrolyte/sulfur (E/S) ratio of 10 μL/mg or less. For example, the E/S ratio of the lithium-sulfur battery may be 10 μL/mg or less, 8 μL/mg or less, 6 μL/mg or less, 4 μL/mg or less, or 2 μL/mg or less. Low activity of the positive electrode puts limitation on reduction in the E/S ratio, the present disclosure can stably reduce the E/S ratio, and the E/S ratio of the lithium-sulfur battery may have a larger value than the above-described range, and it is obvious to those skilled in the art that the lower limit is not limited to a particular value, and the present disclosure is not limited thereto.

In another exemplary embodiment of the present disclosure, the lithium-sulfur battery may have an electrolyte/capacity (E/C) ratio of 10 μL/mAh or smaller. For example, the E/C ratio of the lithium-sulfur battery may be 10 μL/mAh or less, 9 μL/mAh or less, 8 μL/mAh or less, 7 μL/mAh or less, 5 μL/mAh or less, or 4 μL/mAh or less, but the present disclosure is not limited thereto. The electrolyte/capacity (E/C) of the lithium-sulfur battery may be, for example, 1 μL/mAh or more, but the present disclosure is not limited thereto.

According to another aspect of the present disclosure, provided herein is an electrode comprising the above-described carbon composite as an additive. For example, a positive electrode comprising the above-described carbon composite as a positive electrode additive and a sulfur containing material as a positive electrode active material may be provided.

In an exemplary embodiment of the present disclosure, separately from the aspect of the present disclosure in that the carbon composite is used to support the sulfur containing material and included as the positive electrode active material, the carbon composite may be included as an additive that replaces a conductive material in the positive electrode.

In an exemplary embodiment of the present disclosure, when the carbon composite is used as the additive in the positive electrode, it is possible to improve capacity of the battery as well as reactivity with lithium polysulfide and consequential battery performance.

In an exemplary embodiment of the present disclosure, when the carbon composite is used as the additive in the positive electrode, the carbon composite may be included in an amount of 1 to 25 wt %, specifically 1 to 15 wt % or 1 to 10 wt %, based on the total weight of the positive electrode active material, the binder and the carbon composite included in the positive electrode active material layer, but is not limited thereto.

In an exemplary embodiment of the present disclosure, the positive electrode may comprise, as the positive electrode active material, the sulfur containing material or the sulfur containing material supported on a conventional carbon support. For details of the sulfur containing material, reference is made to the description of the electrode according to the aspects as described above. Additionally, the conventional carbon support may be, for example, carbon nanotubes, but is not limited thereto.

According to another aspect, provided herein is a lithium-sulfur battery comprising a positive electrode using the carbon composite as the additive, a negative electrode, a separator between the positive electrode and the negative electrode, and an electrolyte solution.

According to yet another aspect of the present disclosure, provided herein is a battery comprising the carbon composite in any one of a positive electrode and a negative electrode. In this instance, the battery may comprise a positive electrode, a negative electrode, a separator between the positive electrode and the negative electrode and an electrolyte solution, and may not be limited to a lithium-sulfur battery.

In this instance, for details of the other component than the negative electrode, the separator, the electrolyte and the carbon composite of the positive electrode, reference is made to the description of the battery according to the aspects as described above.

Figure 2A:
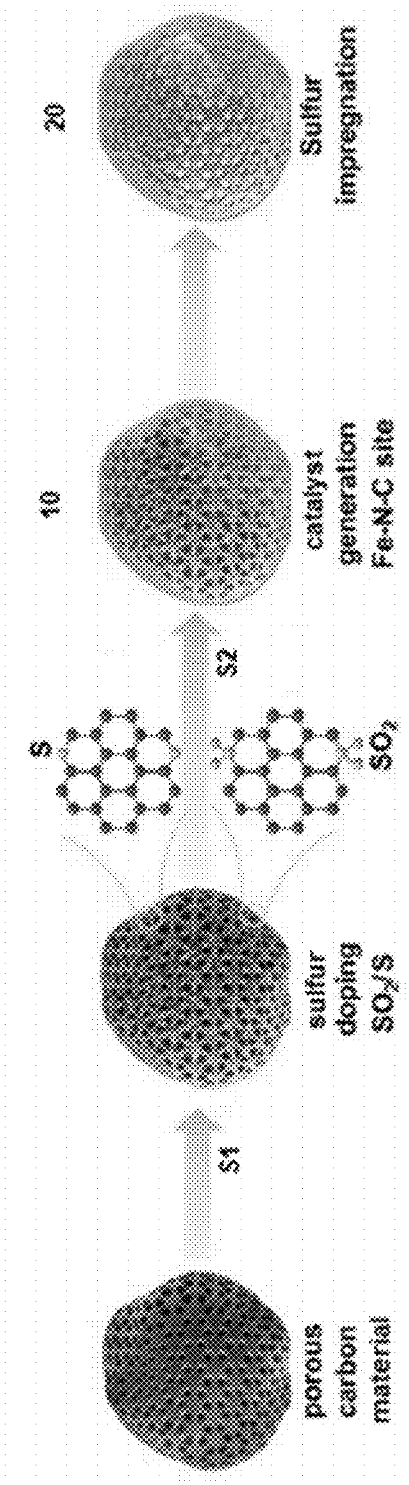
FIG. 2A is a diagram showing a process of manufacturing a carbon composite according to an exemplary embodiment of the present disclosure and an electrode using the same.

FIG. 2A is a diagram showing a process of manufacturing a carbon composite 10 according to an exemplary embodiment of the present disclosure by (S1) doping a heteroelement, sulfur, in porous carbon material; and (S2) forming a catalyst containing a transition metal, and manufacturing a positive electrode active material by impregnating the carbon composite with a sulfur containing material to form an electrode active material 20.

Hereinafter, the method for manufacturing the carbon composite 10 according to an exemplary embodiment of the present disclosure and the method for manufacturing the positive electrode active material 20 using the same are described in detail in examples below. However, the following examples are provided to illustrate the present disclosure and the scope of the present disclosure is not limited thereto.

Preparation Example 1. Synthesis of Porous Carbon Material (MSU-F—C)

A porous carbon material is synthesized using a hard template method by the following process.

First, poly(ethylene glycol)-block-poly(propylene glycol)-block-poly(ethylene glycol) (P123, $M_n$: ~5800 g/mol, Sigma-Aldrich) is dissolved in deionized (DI) water (160 mL) and glacial acetic acid (99.8%, Samchun Pure Chemical Co., 4.58 mL). Subsequently, mesitylene (Merck Millipore, 9.26 mL) is added dropwise and stirring is performed for 1 hour to prepare a P123 solution.

Sodium silicate (Sigma-Aldrich, 15.5 mL) is dissolved in DI water (240 mL) to prepare a sodium silicate solution. The sodium silicate solution is added to the P123 solution, stirred for 5 minutes, and stored at 40° C. for 20 hours without stirring. Subsequently, the solution is aged in an oven at 100° C. for 24 hours. The aged solution is filtered and dissolved again in a mixture of DI water (200 mL) and a HCl solution (35.0-37.0%, Samchun Pure Chemical Co., 5 mL). After 3 hours, the solution is filtered again and sintered at 550° C. for 4 hours to obtain mesoporous silica (MSU-F—$SiO_2$).

The obtained mesoporous silica is dispersed uniformly in ethanol and mixed with $AlCl_3 \cdot 6H_2O$ (98%, Kanto Chemical Co., 0.21 g) to obtain a homogenous mixture. Subsequently, drying is performed in an oven at 60° C. to remove ethanol, and the mixture is sintered at 550° C. for 4 hours to obtain mesoporous silica with Al acid site (Al-MSU-F—$SiO_2$).

The Al-MSU-F—$SiO_2$ as a hard template is impregnated with furfuryl alcohol (Sigma-Aldrich) as a carbon precursor, and thermally treated at 850° C. for 4 hours under Ar atmosphere. Cooling is performed at room temperature, and the Al-MSU-F—$SiO_2$ template is etched using an HF solution (JT Baker) to manufacture a porous carbon material, MSU-F—C, of Preparation Example 1.

Example 1. Manufacture of Carbon Composite (FeNC-EEB-1)

Step 1(S1). Doping of Sulfur in Porous Carbon Material (Formation of EEB Site)

Dibenzyl disulfide (DBDS, 98%) is dissolved in ethanol (100 mL) to prepare a DBDS solution.

The porous carbon (MSU-F—C) as prepared above is uniformly impregnated with the DBDS solution, and grinding is iteratively performed until ethanol completely evaporates. Subsequently, the DBDS-impregnated porous carbon (DBDS-impregnated MSU-F—C) is dried at 80° C. for 1 hour, followed by heat treatment at 900° C. for 1 hour under Ar atmosphere to form EEB site with a low $SO_2$/S molar ratio.

Step 2(S2). Introduction of Transition Metal Catalyst

In order to support a transition metal catalyst on the outer surface of the porous carbon with the EEB site and the inner surface of pores in the porous carbon, a transition metal-containing precursor solution is prepared by dissolving $FeCl_3 \cdot 6H_2O$ (Sigma-Aldrich) and 1,10-phenanthroline (99%, Sigma-Aldrich) in ethanol. Subsequently, the porous carbon material with the EEB site is impregnated with the precursor solution, followed by grinding. The mixture is dried at 80° C. for 1 hour and thermally treated at 900° C. for 1 hour under Ar atmosphere. Cooling is performed at room temperature, followed by stirring in 1 M HCl to remove agglomerated Fe metal residue to obtain the carbon composite (FeNC-EEB-1).

Example 2. Manufacture of Carbon Composite (FeNC-EEB-2)

A carbon composite (FeNC-EEB-2) is manufactured by the same method as Example 1 except that $Na_2S_2O_5$ (97%, Sigma-Aldrich) is used to form EEB site instead of DBDS.

Comparative Example 1. Manufacture of Carbon Composite (FeNC)

A carbon composite (FeNC) is manufactured by the same method as Example 1 except that the step 1($S_1$) is not performed and EEB site is not formed, and a transition metal catalyst is introduced.

[Identification of Doped Sulfur Element]

Figure 2B:
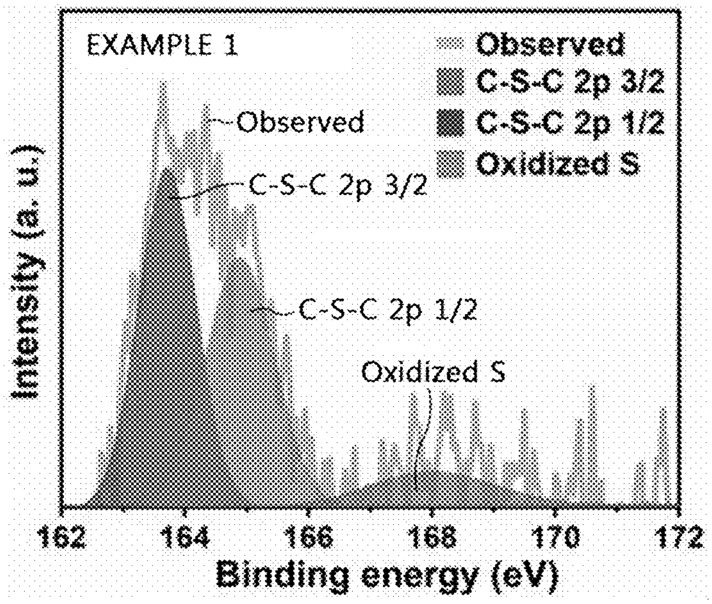
FIG. 2B is a graph showing 2p spectrum of sulfur atom (S) in a carbon composite of Example 1 obtained through X-ray Photoelectron Spectroscopy (XPS) analysis.
Figure 2C:
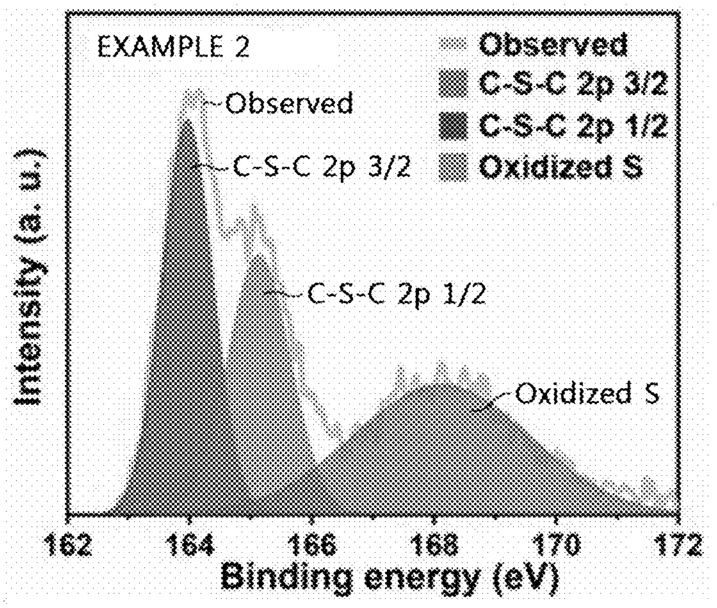
FIG. 2C is a graph showing 2p spectrum of sulfur atom (S) in a carbon composite of Example 2 obtained through XPS analysis.

The 2p spectra of sulfur atom (S) in the carbon composites of Examples 1 and 2 are obtained through X-ray spectroscopy (XPS) (VG Scientific Escalab 250, Al $K_\alpha$), and the results are shown in FIG. 2B (Example 1) and FIG. 2C (Example 2), respectively.

According to FIGS. 2B and 2C, Examples 1 and 2 show 163.7 eV (C—S—C 2p 3/2) and 164.9 eV (C—S—C 2p 1/2) corresponding to two characteristic peaks of S in the —C—S—C— structure formed by doping of sulfur atom in the porous carbon, and 168.0 eV (oxidized S) corresponding to a characteristic peak of $SO_2$ in the —C—$SO_2$—C— formed by doping of sulfur dioxide.

From the above XPS results, it is confirmed that the sulfur is doped in the porous carbon materials of Examples 1 and 2.

Figure 2D:
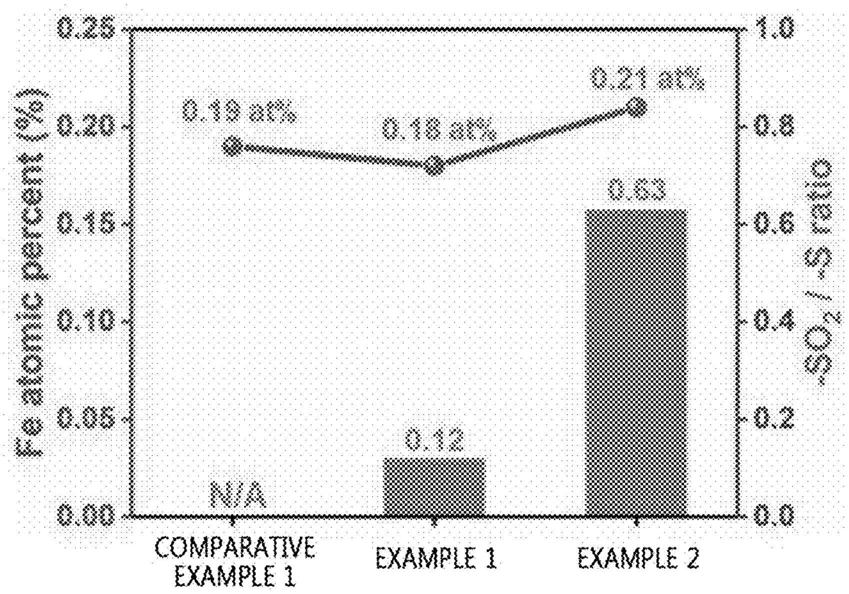
FIG. 2D is a graph showing Fe content and $SO_2/S$ ratio in Comparative Example 1 (FeNC), Example 1 (FeNC-EEB-1) and Example 2 (FeNC-EEB-2) measured through ICP-AES analysis.

Subsequently, iron (Fe) content and molar ratio of $SO_2$/S in the carbon composites of Examples 1 and 2 and Comparative Example 1 are measured through inductively coupled plasma atomic emission spectroscopy (ICP-AES), and the results are shown in FIG. 2D.

According to FIG. 2D, Examples 1 and 2 exhibit different $SO_2$/S molar ratios at the EEB site. Specifically, Example 1 exhibits the $SO_2$/S molar ratio of 0.12, and Example 2 exhibits the $SO_2$/S molar ratio of 0.63 that is about 5 times higher than that of Example 1. Presumably, $Na_2S_2O_5$ used in Example 2 as a sulfur doping precursor forms —$SO_2$ species at high temperature more stably due to its higher oxygen fraction than DBDS.

Figure 3:
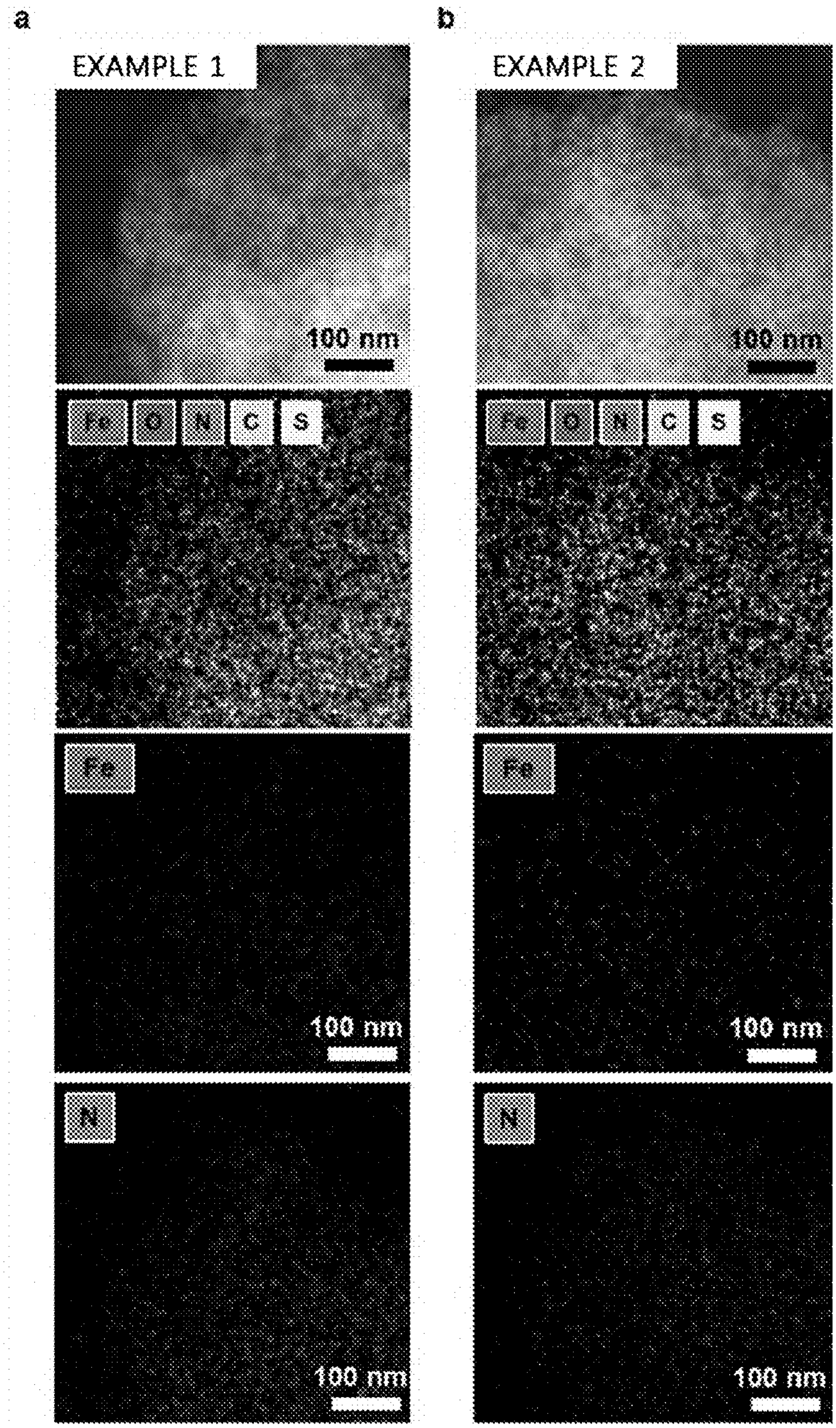
FIG. 3 is an image showing the result of analyzing the distribution of Fe, O, N, C and S of Example 1 (FeNC-EEB-1) and Example 2 (FeNC-EEB-2) through Energy-dispersive X-ray Spectroscopy (EDS) analysis.

In addition, FIG. 3 shows energy-dispersive spectroscopic (EDS) mapping images of Examples 1 and 2. The EDS mapping images were obtained through the elemental distribution results of Fe single atom and other components using high-resolution TEM (HR-TEM; Titan cubed G2 60-300). According to FIG. 3, each of Examples 1 and 2 exhibits uniform distribution of Fe, N, C, S and O atoms along the particles. Through this EDS mapping results, it is confirmed that EEB site is formed according to generation of the catalyst containing a transition metal and doping of the sulfur in the carbon composite. In particular, according to FIG. 3, it is confirmed that the nearest interatomic distance between Fe and S in each of the carbon composites of Examples 1 and 2 is 2 nm or less.

[Structural Analysis of Carbon Composite]

The structures of the carbon composites of Example 1, Example 2 and Comparative Example 1 are identified by the following method.

Microscopic Observation

Figure 4:
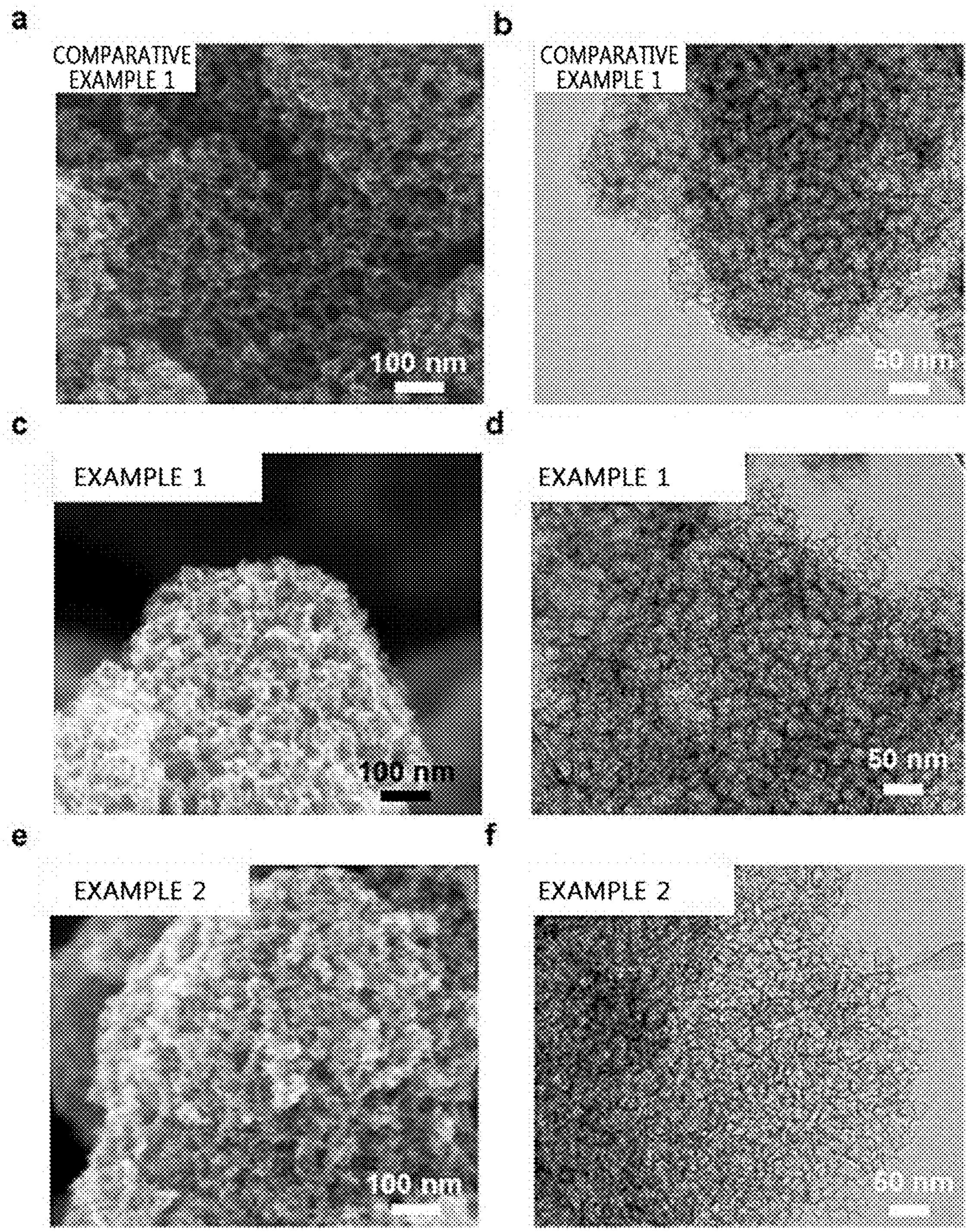
FIG. 4 is an image showing the shape of Comparative Example 1 (FeNC), Example 1 (FeNC-EEB-1) and Example 2 (FeNC-EEB-2) through Scanning Electron Microscopy (SEM) (left) and Transmission Electron Microscopy (TEM) (right).

FIG. 4 shows images obtained through SEM (S-4800 field emission, Hitachi) and TEM (G2 F30 S-Twin, Tencai) for each of the carbon composites of Example 1, Example 2 and Comparative Example 1. In FIG. 4, FeNC is the carbon composite according to Comparative Example 1, FeNC-EEB-1 is the carbon composite according to Example 1 and FeNC-EEB-2 is the carbon composite according to Example 2, and FIG. 4, images on the left are SEM images and images on the right are TEM images.

Analysis of Pore Characteristics

Figure 5:
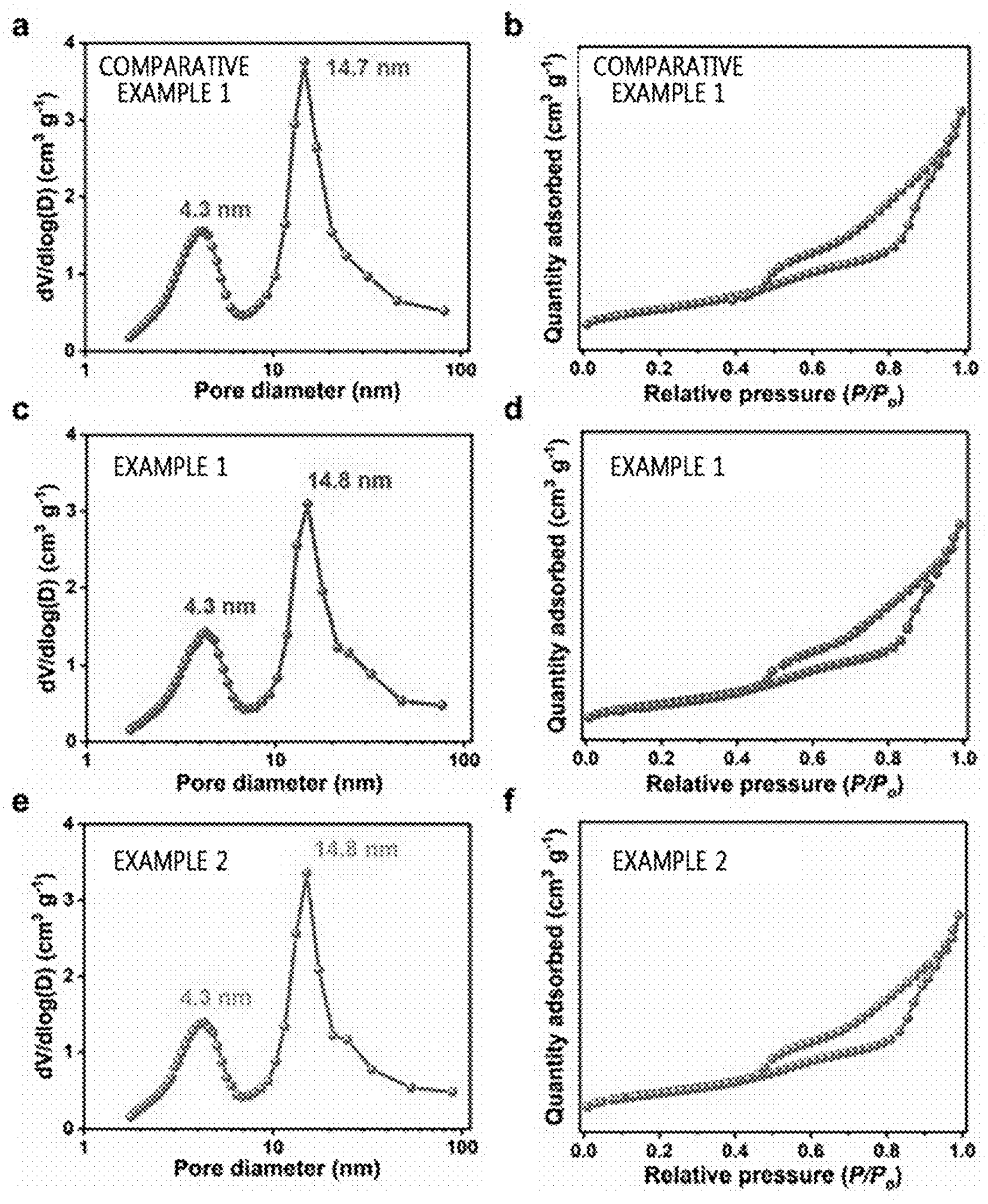
FIG. 5 is a graph showing the result of determining the pore diameter and relative pressure of Comparative Example 1 (FeNC), Example 1 (FeNC-EEB-1) and Example 2 (FeNC-EEB-2) through nitrogen physisorption analysis.

The pore diameter (left) and relative pressure (right) are identified through nitrogen physisorption analysis for each of the carbon composites of Example 1, Example 2 and Comparative Example 1, and the results are shown in FIG. 5.

In particular, specific surface area and pore analysis is performed on Comparative Example 1 and Examples 1 and 2 by the following method.

First, to remove water physically adsorbed in the pores, pretreatment is performed on the analyte by drying at 120° C. overnight in a vacuum. Subsequently, liquid nitrogen of 77 K is physically adsorbed onto the surface and the pores of the analyte in a vacuum until equilibrium pressure is reached. The specific surface area of the porous material is calculated using Brunauer-Emmett-Teller (BET) of $N_2$ isotherm obtained by measurements. Additionally, a pore volume value is obtained through Barrett-Joyner-Halenda (BJH) calculation based on the obtained $N_2$ isotherm.

The result of measuring the surface area, the pore diameter $D_{50}$ and the pore volume for each of the carbon composites of Example 1, Example 2 and Comparative Example 1 is shown in Table 1.

As can be seen from FIG. 5, as a result of analyzing the pore diameter $D_{50}$, a bimodal pore diameter $D_{50}$ distribution is found. In the following Table 1, among the two peaks, the peak with a smaller diameter is indicated as a first pore diameter peak, and the peak with a larger diameter is indicated as a second pore diameter peak.

TABLE 1

| | BET specific surface area ($m^2/g$) | Pore diameter (nm) | Pore volume ($cm^3/g$) |
|---|---|---|---|
| Comparative Example 1 | 806 | First pore diameter peak: 4.3, second pore diameter peak: 14.7 | 2.1 |
| Example 1 | 708 | First pore diameter peak: 4.3, second pore diameter peak: 14.8 | 1.8 |
| Example 2 | 731 | First pore diameter peak: 4.3, second pore diameter peak: 14.8 | 1.8 |

According to the results of FIGS. 4 and 5 and Table 1, it is confirmed that each of the carbon composites of Example 1, Example 2 and Comparative Example 1 has a porous structure with the BET specific surface area of 700 $m^2/g$ or more and the pore size of 4 to 5 nm and 10 to 15 nm.

Identification of Transition Metal Distribution

Figure 6:
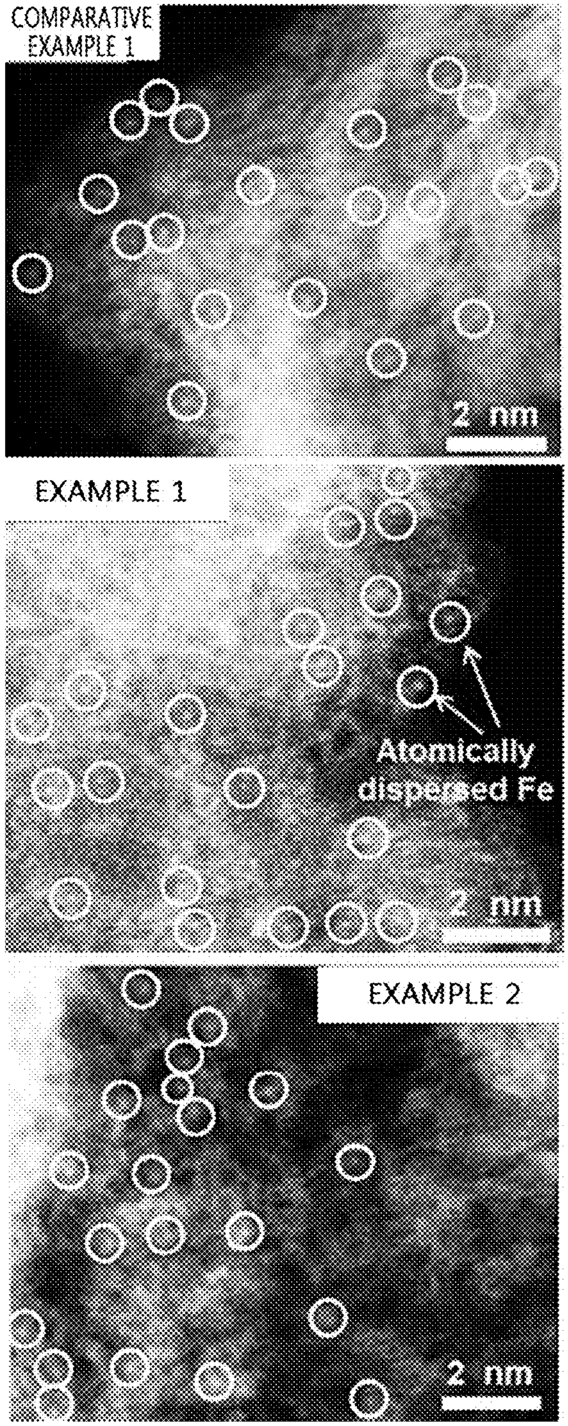
FIG. 6 is an image showing the shape of Comparative Example 1 (FeNC), Example 1 (FeNC-EEB-1) and Example 2 (FeNC-EEB-2) through Scanning Transmission Electron Microscopy (STEM).

FIG. 6 shows images obtained through high-angle annular dark-field scanning transmission electron microscopy (STEM) for each of Comparative Example 1, Example 1 and Example 2. The STEM images are obtained through elemental distribution results of Fe single atom and other components using high-resolution TEM (HR-TEM; Titan cubed G2 60-300). According to FIG. 6, it is confirmed that the transition metal, Fe, is dispersed in the porous carbon in single atom scale in Comparative Example 1, Example 1 and Example 2.

Figure 7:
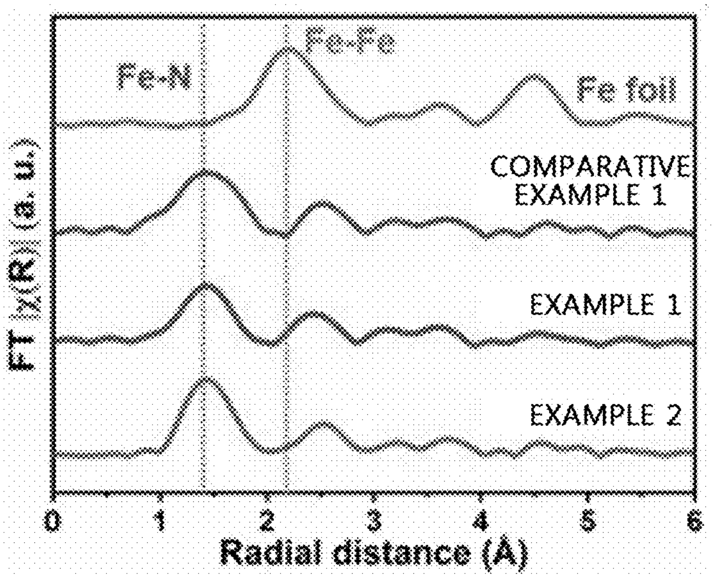
FIG. 7 is a graph showing the Fe bond in Comparative Example 1 (FeNC), Example 1 (FeNC-EEB-1), Example 2 (FeNC-EEB-2) and a Fe foil through Fourier Transformed Extended X-ray Absorption Fine Structure (FT-EXAFS).

In addition, FIG. 7 shows the Fourier-transformed extended X-ray absorption fine structure (FT-EXAFS) results of Comparative Example 1, Example 1 and Example 2. FIG. 7 also shows the result of evaluating Fe foil to compare the chemical state of iron distributed in the carbon composite with that of iron metal alone.

According to FIG. 7, it is confirmed that the Fe foil has Fe—Fe metallic bonding (2.2 Å), while Comparative Example 1, Example 1 and Example 2 do not have Fe—Fe metallic bonding, and show newly formed Fe—N (1.4 Å) and Fe—C (2.4 Å) peaks. Through this result, it is confirmed that Fe—Fe metallic bonding, i.e., Fe metal particles are not included in the catalysts (Fe—N—C) present in Comparative Example 1, Example 1 and Example 2.

[Identification of Catalytic Function of Carbon Composite]

Figure 8:
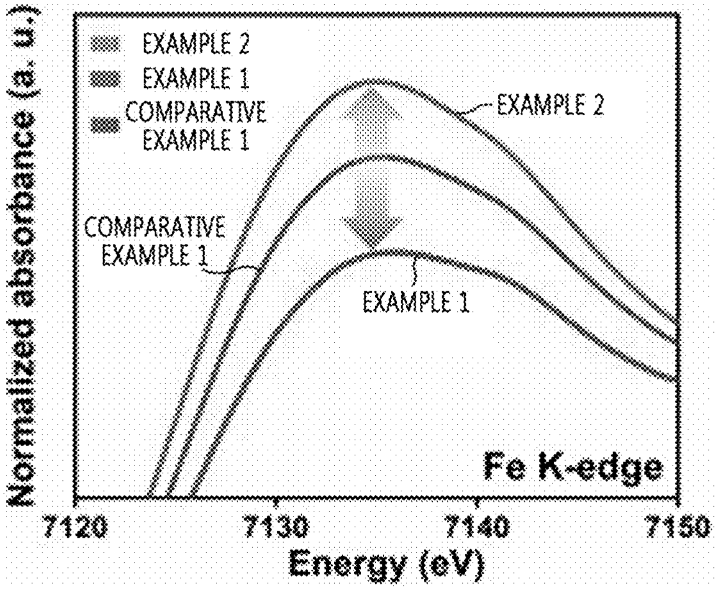
FIG. 8 shows the Fe K-edge X-ray Absorption Near Edge Structure (XANES) measurement results of Comparative Example 1 (FeNC), Example 1 (FeNC-EEB-1) and Example 2 (FeNC-EEB-2).

FIG. 8 shows a graph obtained using Fe K-edge (X-ray absorption near-edge structure (XANES) analysis for the carbon composites of Example 1, Example 2 and Comparative Example 1.

According to the results of FIG. 8, the white line intensity of Example 1 is lower than that of Comparative Example 1, and the white line intensity of Example 2 is higher than that of Comparative Example 2. That is, it is confirmed that since Example 1 has a low $SO_2/S$ ratio and shows an upshift of the Fe d-band center, Example 1 can have activity in the electron transfer from EEB site to Fe.

In contrast, it is found that since Example 2 has a high $SO_2/S$ ratio and shows a downshift of the Fe d-band center, Example 2 can have activity in the electron transfer from Fe to EEB site.

Through this result, it is confirmed that the d-orbital level of the carbon composite can be modulated by electron exchange according to the doping structure of sulfur near the catalyst that can form a coordinate bond with the transition metal, i.e., according to the $SO_2/S$ ratio.

[Manufacture of Coin-Type Lithium-Sulfur Battery]

In order to identify the conversion reaction activity of sulfur and polysulfide of the carbon composite, a coin-type lithium-sulfur battery is manufactured as follows.

Example 3

Manufacture of Positive Electrode 30 wt % of the carbon composite of Example 1 (FeNC-EEB-1) is mixed with 70 wt % of sulfur (sulfur powder, Sigma-Aldrich) and heated at 155° C. for 8 hours to obtain a positive electrode active material.

In order to fabricate working electrode, the positive electrode active material and polyvinylidene difluoride (PVDF) as a binder are mixed at a weight ratio of 9:1 using N-methyl-2-pyrrolidone (NMP) as a solvent to prepare a positive electrode slurry.

The positive electrode slurry as prepared above is coated on a carbon-coated Al foil and dried at 60° C. for 8 hours. Subsequently, the resultant product is pressed and cut into a coin shape to manufacture a positive electrode.

Manufacture of Battery

A positive electrode, a negative electrode and a separator between the positive electrode and the negative electrode are placed in a case together with an electrolyte solution to manufacture a battery.

The positive electrode is manufactured as described above, and the separator is a porous polypropylene membrane (Celgard 2400, Welcos Ltd.). Lithium metal (200 μm thickness) is used for each of a reference electrode and a counter electrode. The electrolyte solution comprises a mixed solvent of dimethoxymethane and 1,3-dioxolane (DME/DOL) at a volume ratio of 1:1 (Panax E-Tec Co., Korea), 1.0 M LiTFSI (bis(trifluoromethane)sulfonamide lithium salt) as an electrolyte and 2.0 wt % of $LiNO_3$ (99.99% metal basis, Sigma-Aldrich) as an additive.

The sulfur loading amount in the positive electrode is 2.0 mg/cm$^2$, and the E/S ratio of the battery is 10 μL/mg Example 4

A battery is manufactured by the same method as Example 3 except that Example 2 (FeNC-EEB-2) is used for the carbon composite when manufacturing the positive electrode.

Comparative Example 2

A battery is manufactured by the same method as Example 3 except that Comparative Example 1 (FeNC) is used for the carbon composite when manufacturing the positive electrode.

Preparation Example 2

A battery is manufactured by the same method as Example 3 except that the porous carbon material of Preparation Example 1 (MSU-F—C) is used instead of the carbon composite when manufacturing the positive electrode.

[Performance Evaluation of Coin-Type Lithium-Sulfur Battery]

The redox kinetic activity of lithium sulfide ($Li_2S$) is evaluated by the following method using the coin-type lithium-sulfur batteries manufactured as above.

Figure 9A:
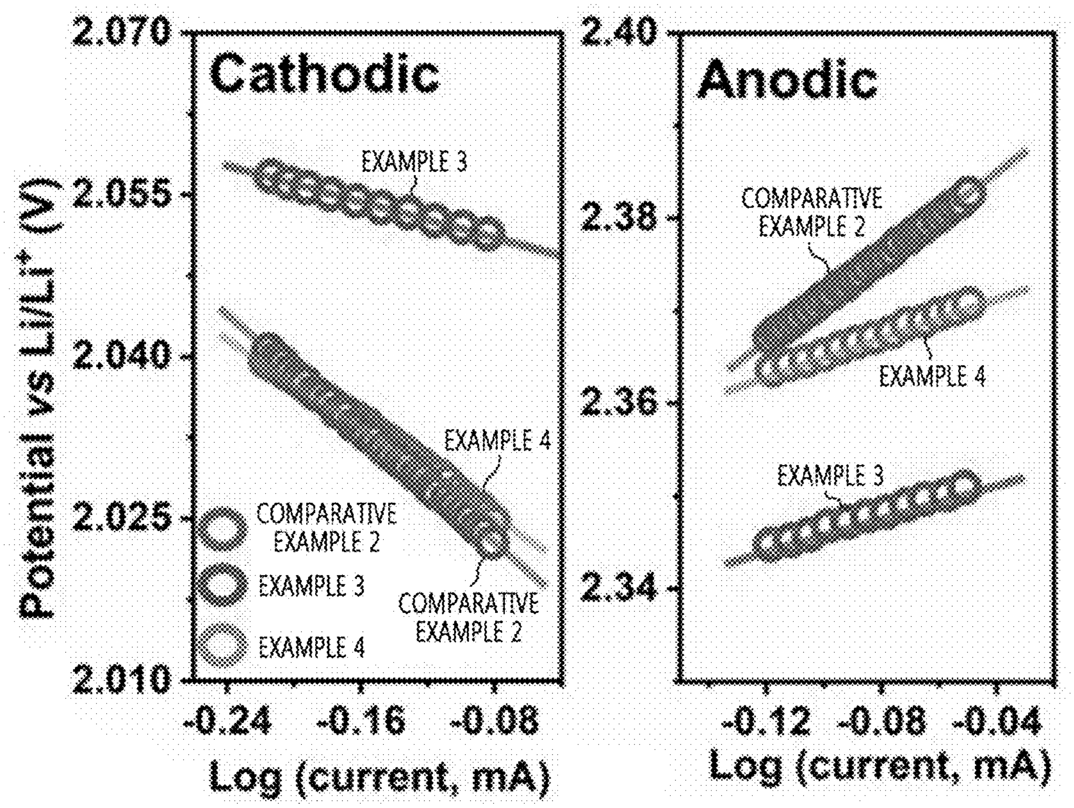
FIG. 9A is a Tafel plot graph obtained by measuring the current/voltage during the operation of coin-type lithium-sulfur batteries of Comparative Example 2 (FeNC), Example 3 (FeNC-EEB-1) and Example 4 (FeNC-EEB-2).

First, FIG. 9A shows Tafel plots obtained for evaluating the redox kinetics of sulfur. According to FIG. 9A, in the cathodic reaction, the Tafel slope of Example 3 is much lower than that of Comparative Example 2, while the Tafel slope of Example 4 is slightly lower than that that of Comparative Example 2. In contrast, in the anodic reaction, both Examples 3 and 4 exhibit lower Tafel slopes than Comparative Example 2, demonstrating that the doped sulfur near the catalyst, i.e., the $SO_2$/S EEB site, improves the redox kinetics of sulfur.

Figure 9B:
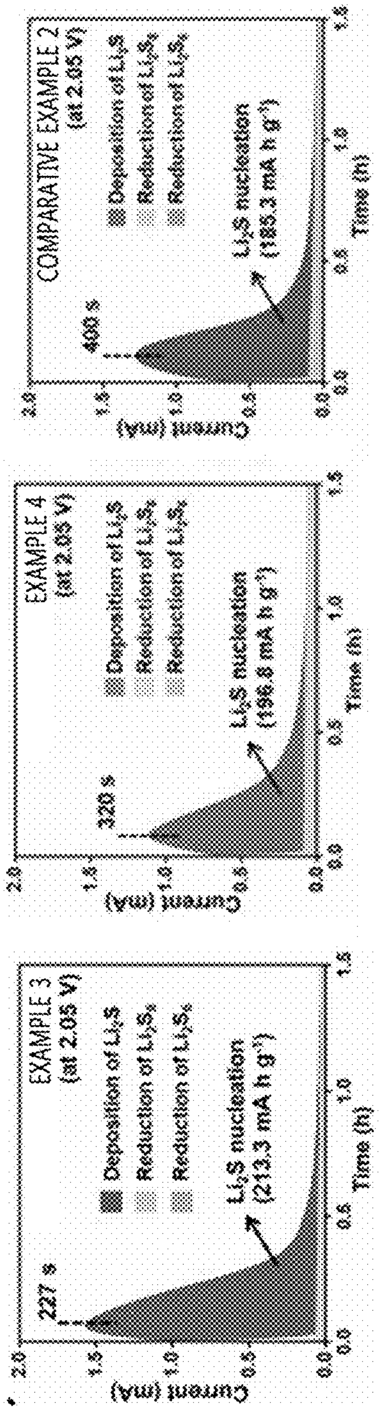
FIG. 9B is a graph showing the potentiostatic (2.05 V) discharging results of Comparative Example 2 (FeNC), Example 3 (FeNC-EEB-1) and Example 4 (FeNC-EEB-2).
Figure 9C:
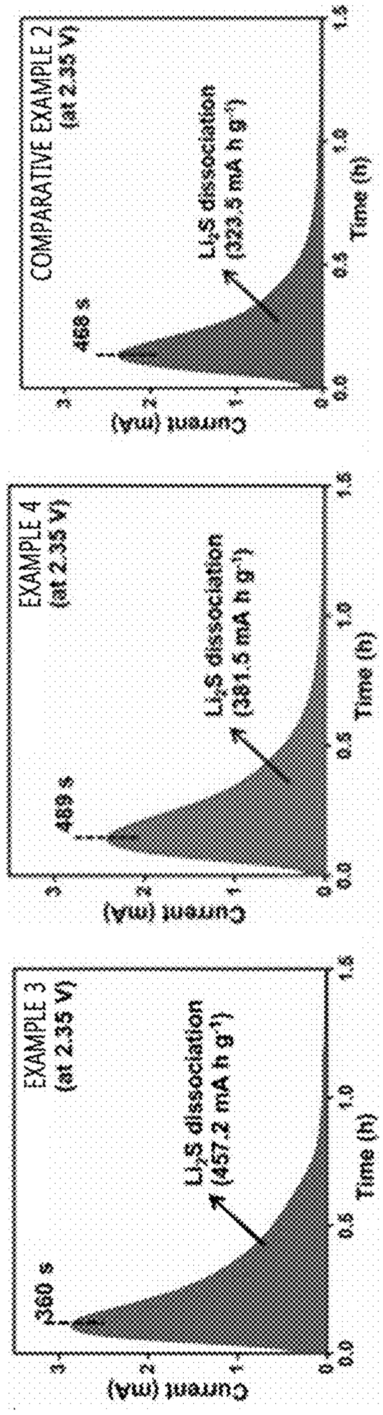
FIG. 9C is a graph showing the potentiostatic (2.35 V) charging results of Comparative Example 2 (FeNC), Example 3 (FeNC-EEB-1) and Example 4 (FeNC-EEB-2).

Subsequently, potentiostatic analysis is performed to understand the electrochemical kinetics of sulfur by the EEB site on the nucleation/dissociation behaviors of lithium sulfide of the batteries of Examples 3 and 4 and Comparative Example 2, and the results are shown in FIGS. 9B and 9C. In FIGS. 9B and 9C, the capacity is calculated based on the weight of sulfur in the electrode.

According to FIG. 9B, during the potentiostatic discharge at 2.05 V, the maximum current time $t_m$ is 227 seconds (Example 3), 320 seconds (Example 4) and 400 seconds (Comparative Example 2), respectively. Considering that the $t_m$ value is highly related to the nucleation density $N_0$ and growth rate $k^2$ of lithium sulfide as shown in the following equation, it is found that the improved nucleation of lithium sulfide in the battery of Example 3 induces higher nucleation capacity (213.3 mAh/g) of lithium sulfide. Example 4 (196.8 mAh/g) has slightly lower capacity than Example 3 (213.3 mAh/g) but much improved capacity characteristics than Comparative Example 2 (185.3 mAh/g).

$$t_m=(2\pi N_0 k^2)^{-0.5}$$

According to FIG. 9C, it is found that, during the potentiostatic charge at 2.35 V, Example 3 has lower $t_m$ (360 seconds) and higher $Li_2S$ dissociation capacity (457.2 mAh/g) than Comparative Example 2 ($t_m$: 468 seconds, $Li_2S$ dissociation capacity 323.5 mAh/g). It is found that Example 4 has higher $t_m$ (489 seconds) and higher $Li_2S$ dissociation capacity (381.5 mAh/g) than Comparative Example 2.

Through this comparison of the results of Comparative Example 2 and Examples 3 and 4, it is found that the kinetics of the conversion reaction in which lithium sulfide gets involved on the catalyst can be improved by introducing $SO_2$/S EEB site formed by doping sulfur near the catalyst containing a transition metal. In particular, it is found that EEB site with low $SO_2$/S ratio (Example 3) is more effective in promoting the nucleation/dissociation reaction of lithium sulfide on the catalysts than EEB site with high $SO_2$/S ratio (Example 4).

Figure 10A:
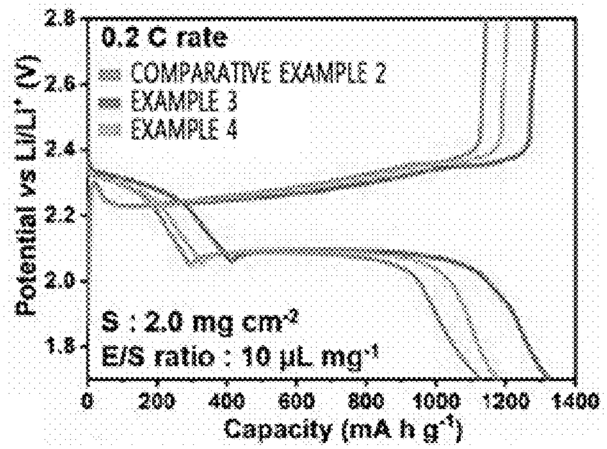
FIGS. 10A to 10C show the results of evaluating the charging and discharging performance of Comparative Example 2 (FeNC), Example 3 (FeNC-EEB-1) and Example 4 (FeNC-EEB-2).
Figure 10B:
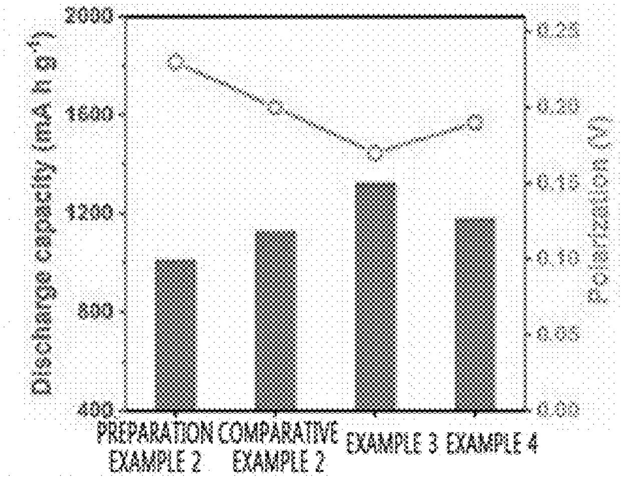
Figure 10C:
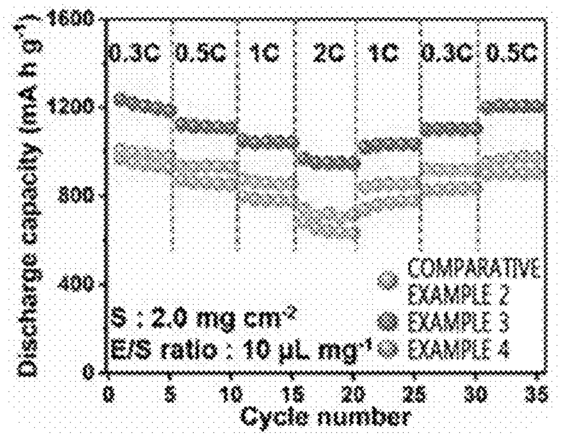

Subsequently, to evaluate the charge-discharge performance of the batteries of Comparative Example 2, Example 3 and Example 4, charge-discharge performance evaluation is performed on the batteries of Comparative Example 2, Example 3 and Example 4 at the current density of 0.2 to 3.0 C rate (1 C rate~1675 mA/g) in the voltage range between 1.7 and 2.8 V (vs. Li/Li$^+$), and the results are shown in FIGS. 10A to 10C.

FIG. 10A shows the initial voltage characteristics of the batteries of Comparative Example 2, Example 3 and Example 4 at 0.2 C rate. According to FIG. 10A, it is found that Comparative Example 2 has high initial discharge capacity (1125 mAh/g) due to the presence of the catalyst (FeNC), but the batteries of Example 3 (1324 mAh/g) and Example 4 (1179 mAh/g) have even higher initial discharge capacity than Comparative Example 2.

In addition to the result of the battery of Comparative Example 2 using FeNC-EEB-1 for comparison, FIG. 10B include the result of the battery having the positive electrode manufactured using the porous carbon (MSU-F—C) according to Preparation Example 1 (Preparation Example 2). According to the results of FIG. 10B, the batteries of Example 3 (0.17 V) and Example 4 (0.185 V) exhibit improved polarization degree compared to Comparative Example 2 (0.205 V).

FIG. 10C shows the result of measuring rate capabilities of the batteries of Comparative Example 2, Example 3 and Example 4 at different current densities in a range of 0.3 to 2.0 C rate. According to the results of FIG. 10C, the rate capability is measured in the order of Comparative Example 2<Example 4<Example 3, and it is found that Example 3 has the greatest improvement in rate capability.

Figure 11:
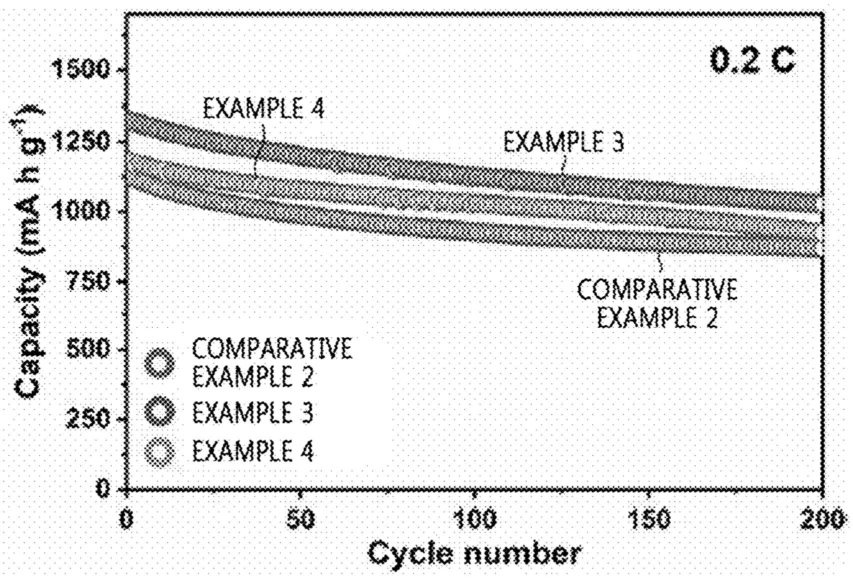
FIG. 11 is a graph showing the result of charging and discharging for 200 cycles in Comparative Example 2 (FeNC), Example 3 (FeNC-EEB-1) and Example 4 (FeNC-EEB-2).

FIG. 11 is a graph showing the result of measuring discharge capacity during repeated charging and discharging for 200 cycles at 0.2 C. According to FIG. 11, it is found that the battery of Comparative Example 2 shows the capacity of 864 mAh/g after 200 cycles, while the battery of Example 4 shows the capacity of 925 mAh/g that is about 7% higher than Comparative Example 2, and the battery of Example 3 shows the capacity of 1030 mAh/g that is about 10% higher than Example 4. Accordingly, it is found that the batteries of Examples 3 and 4 exhibit high capacity retention after repeated charge and discharge for 200 cycles, and thus they have high cycling stability.

Figure 12:
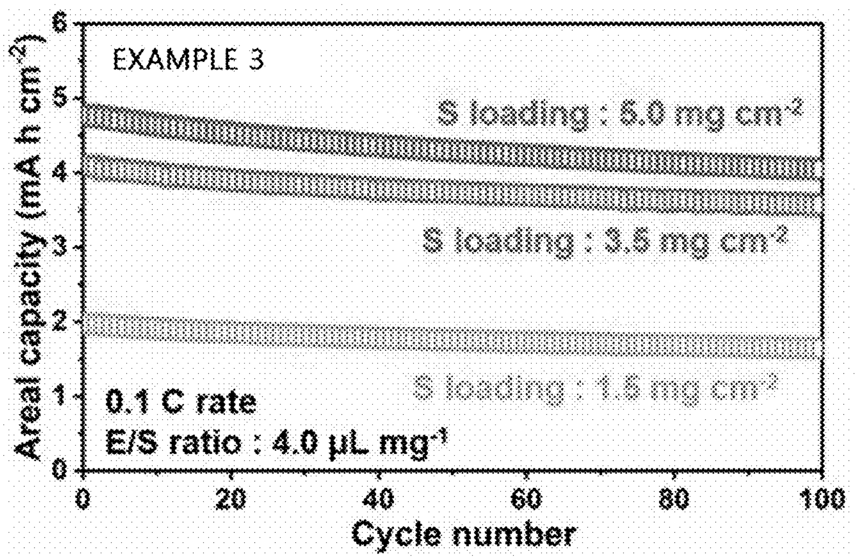
FIG. 12 is a graph showing the result of charging and discharging for 100 cycles with varying sulfur loadings and E/S ratios in Example 3 (FeNC-EEB-1).

FIG. 12 shows the result of additional experiments by measuring discharge capacity after repeated charge and discharge for 100 cycles in 0.1 C rate condition at changing sulfur loading amount to 1.5 mg/cm$^2$, 3.5 mg/cm$^2$ and 5.0 mg/cm$^2$ and the E/S ratio adjusted to 4.0 μL/mg when manufacturing the positive electrode of Example 3. According to FIG. 12, the lithium-sulfur battery using FeNC-EEB-1 carbon composite have the improved performance even under harsh conditions.

Through the above results, it is found that there are improvements in terms of high capacity, cycling stability and rate capability and low polarization of the lithium-sulfur battery through the catalyst with $SO_2$/S EEB site formed by sulfur doping near the catalyst containing a transition metal.

In particular, the carbon composite with EEB site having low $SO_2$/S ratio is more effective in the performance improvement of the lithium-sulfur battery than the carbon composite with EEB site having high $SO_2$/S ratio. The additional testing reveals that the —C—S—C— structure near the catalyst is more effective in modulating the LiPS binding energy and the energy barrier of the conversion reaction between $Li_2S_4$ and $Li_2S$ than the —C—$SO_2$—C— structure.

Manufacture of Battery

Example 5

Manufacture of Positive Electrode 75 wt % of sulfur (sulfur powder, Sigma-Aldrich) is supported on 25 wt % of carbon nanotubes (CNTs, BET specific surface area 150-350 $m^2$/g) to obtain a positive electrode active material.

The positive electrode active material, carbon nanotubes (CNTs, BET specific surface area 150-350 $m^2$/g) as a conductive material, the carbon composite prepared in Example 1 (FeNC-EEB-1) as an additive and PVDF (polyvinylidene difluoride) as a binder are mixed at a weight ratio of 90:2.5:2.5:5 using an NMP (N-methyl-2-pyrrolidone) solvent to prepare a positive electrode slurry.

The positive electrode slurry as prepared above is coated on a carbon-coated Al foil and dried at 60° C. for 8 hours. Subsequently, the electrode is pressed and cut into a coin shape to manufacture a positive electrode.

Manufacture of Battery

A battery is manufactured by the same method as Example 3 except that the positive electrode manufactured above is used.

The sulfur loading amount in the positive electrode is 3.5 mg/$cm^2$.

Comparative Example 3

A battery is manufactured by the same method as Example 5 except that the carbon composite (FeNC-EEB-1) is not included, and the positive electrode active material, the conductive material and the binder are mixed at a weight ratio of 90:5:5 to prepare a positive electrode slurry.

The sulfur loading amount in the positive electrode was 3.5 mg/$cm^2$.

[Evaluation of Battery Performance]

Figure 13:
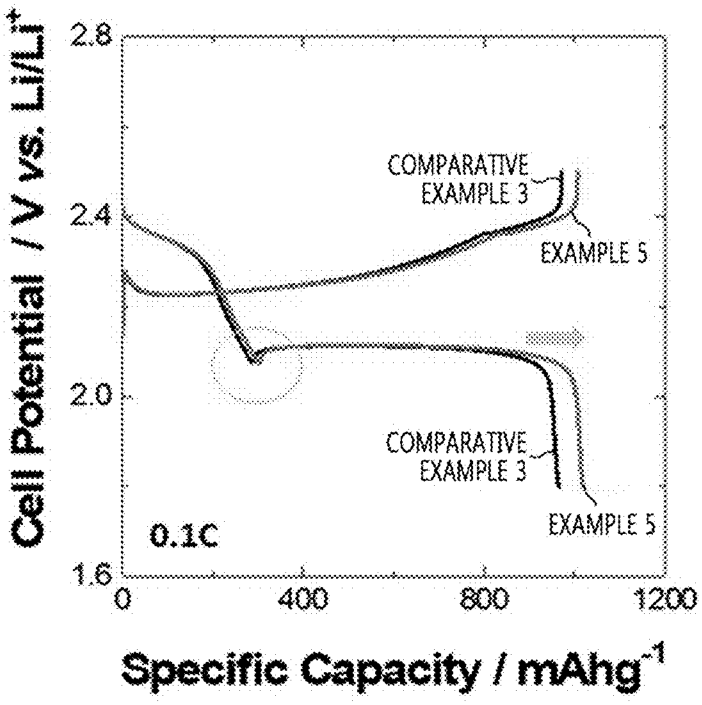
FIG. 13 is a graph showing the result of evaluating the charging and discharging performance of Comparative Example 3 and Example 5.

To evaluate the charge/discharge performance of the batteries of Example 5 and Comparative Example 3, charge/discharge performance evaluation is performed on the batteries of Example 5 and Comparative Example 3 at the current density of 0.1 C rate in the voltage range of 1.7 to 2.6 V (vs. Li/$Li^+$), and the results are shown in FIG. 13.

FIG. 13 shows initial voltage characteristics of the batteries of Example 5 and Comparative Example 3 at 0.1 C rate. According to FIG. 13, it is found that the battery of Example 5 has improved initial discharge capacity and battery reactivity due to the use of the carbon composite (FeNC-EEB-1) as the positive electrode additive.

Presumably, the carbon composite according to the present disclosure is more effective as a catalyst additive for adsorbing lithium polysulfide and promoting the conversion reaction than the conductive material commonly used in the positive electrode, but the effect of the present disclosure is not limited thereto.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A carbon composite for an electrode of a battery comprising:

a porous carbon material including an outer surface and pores comprising an inner surface, the porous carbon material being doped with a heteroelement; and a catalyst formed on the outer surface or the inner surface of at least a plurality of the pores, wherein the catalyst comprises a transition metal, wherein the heteroelement comprises sulfur, and wherein the sulfur comprises S and $SO_2$.

2. The carbon composite according to claim 1, wherein a distance between a transition metal atom of the catalyst closest to a neighboring heteroelement doped in the porous carbon material and the neighboring heteroelement is 10 nm or less.

3. The carbon composite according to claim 1, wherein the carbon composite has a BET specific surface area of 200 $m^2$/g or larger.

4. The carbon composite according to claim 1, wherein the catalyst further comprises a non-metal element forming a ligand with the transition metal.

5. The carbon composite according to claim 4, wherein the non-metal element is one or more selected from the group consisting of hydrogen, boron, nitrogen, oxygen, fluorine, neon, silicon, phosphor, chlorine, bromine, and iodine.

6. The carbon composite according to claim 4, wherein the catalyst comprises iron as the transition metal and nitrogen as the non-metal element.

7. The carbon composite according to claim 4, wherein the catalyst further comprises an organic support.

8. The carbon composite according to claim 1, wherein the catalyst comprises a single atom catalyst, and wherein the transition metal is atomically dispersed in the carbon composite.

9. The carbon composite according to claim 1, wherein the catalyst comprises particles containing the transition metal, and wherein an average particle size $D_{50}$ of the particles is 1 to 30 times larger than a diameter of a transition metal atom of the catalyst.

10. The carbon composite according to claim 1, wherein the transition metal is one or more selected from the group consisting of zinc, vanadium, chromium, manganese, iron, cobalt, nickel, copper, zirconium, niobium, molybdenum, technetium, rubidium, rhodium, palladium, silver, cadmium, lanthanum, hafnium, tantalum, tungsten, osmium, iridium, cerium, gallium, scandium, titanium, gallium, and indium.

11. The carbon composite according to claim 1, wherein the transition metal includes iron.

12. The carbon composite according to claim 1, wherein a molar ratio of the heteroelement doped in the porous carbon to the transition metal of the catalyst is 0.5:1 to 8:1.

13. The carbon composite according to claim 1, wherein a molar ratio of $SO_2$ to S is 1 or less.

14. The carbon composite according to claim 13, wherein a molar ratio of $SO_2$ to S is in a range from 0.1 to 0.7.

15. The carbon composite according to claim 1, wherein the pores of the porous carbon material comprise micropores having pore diameters equal to or larger than 0.2 nm and smaller than 2 nm, mesopores having pore diameters from 2 nm to 50 nm, and macropores having pore diameters larger than 50 nm and equal to or smaller than 300 nm, and wherein a volume ratio of the micropores and mesopores to the macropore is 9:1 to 1:5.

16. The carbon composite according to claim 1, wherein the porous carbon material has a Raman peak intensity ratio, $I_G/I_D$, of 1 or less, wherein $I_G$ is a peak intensity for a crystalline region and $I_D$ is a peak intensity for a non-crystalline region in a Raman spectrum.

17. The carbon composite according to claim 1, wherein a content of the transition metal is 1.0 to 20.0 weight percent based on the total weight of the carbon composite.

18. The carbon composite according to claim 1, wherein the catalyst is formed on the outer surface and the inner surface of the plurality of pores.

19. An electrode active material comprising the carbon composite according to claim 1; and a sulfur containing material.

20. The electrode active material according to claim 19, wherein the sulfur containing material comprises an elemental sulfur ($S_8$), $Li_2S_n$ where n≥1, disulfide compounds, organosulfur compounds, carbon-sulfur polymers $(C_2S_x)_n$ where x=2.5 to 50 and n≥2, or a mixture of two or more thereof.

21. The electrode active material according to claim 19, wherein a content ratio of the carbon composite to the sulfur containing material ranges from 1:9 to 9:1 by weight.

22. An electrode comprising the electrode active material according to claim 19.

23. A battery comprising:

a first electrode;

a second electrode;

a separator between the first electrode and the second electrode; and an electrolyte, wherein the first electrode is the electrode according to claim 22.

24. The battery according to claim 23, wherein the second electrode is a lithium metal electrode.

25. A lithium-sulfur battery comprising:

a first electrode comprising the carbon composite according to claim 1 and a sulfur containing material;

a second electrode comprising a lithium metal;

a separator between the first electrode and the second electrode; and an electrolyte.

26. A method of preparing the carbon composite for an electrode of a battery according to claim 1, the method comprising:

heat treating a heteroelement doping precursor and a porous carbon which are in contact to form a porous carbon material doped with a heteroelement; and immersing the porous carbon material doped with the heteroelement in a solution containing a transition metal catalyst precursor and a solvent and then removing the solvent.

27. The method of claim 26, wherein the heat treating is performed at a temperature range of 800 °C to 1,000 °C.

28. The method of claim 26, wherein the heteroelement doping precursor is dibenzyldisulfide (DBDS), sodium bisulfate ($Na_2S_2O_5$), sodium pyrosulfate ($Na_2S_2O_7$), sodium thiosulfate ($Na_2S_2O_3$), thiourea ($CH_4N_2S$), sodium sulfide ($Na_2S$), potassium thiocyanate (KSCN), benzyl mercaptan ($C_7H_8S$), benzothiophene ($C_8H_6S$), dibenzothiophene ($C_{12}H_8S$), or a mixture of two or more thereof.

29. The method of claim 26, wherein the solution containing transition metal comprises:

organic solvent;

a precursor compound of a non-metal element; and a precursor compound of a transition metal.

* * * * *